US011498156B2

(12) United States Patent
Hirano et al.

(10) Patent No.: US 11,498,156 B2
(45) Date of Patent: Nov. 15, 2022

(54) LASER PROCESSING APPARATUS

(71) Applicant: NIPPON STEEL & SUMITOMO METAL CORPORATION, Tokyo (JP)

(72) Inventors: Koji Hirano, Kisarazu (JP); Hirofumi Imai, Kisarazu (JP); Hideyuki Hamamura, Futtsu (JP); Tatsuhiko Sakai, Oita (JP)

(73) Assignee: NIPPON STEEL CORPORATION, Tokyo (JP)

( * ) Notice: Subject to any disclaimer, the term of this patent is extended or adjusted under 35 U.S.C. 154(b) by 164 days.

(21) Appl. No.: 15/322,399

(22) PCT Filed: Jul. 3, 2014

(86) PCT No.: PCT/JP2014/067754
§ 371 (c)(1),
(2) Date: Dec. 27, 2016

(87) PCT Pub. No.: WO2016/002036
PCT Pub. Date: Jan. 7, 2016

(65) Prior Publication Data
US 2017/0136575 A1 May 18, 2017

(51) Int. Cl.
*B23K 26/073* (2006.01)
*B23K 26/00* (2014.01)
(Continued)

(52) U.S. Cl.
CPC ........ *B23K 26/0736* (2013.01); *B23K 26/073* (2013.01); *B23K 26/356* (2015.10);
(Continued)

(58) Field of Classification Search
CPC .............. B23K 26/073; B23K 26/0736; B23K 26/0069; B23K 26/356; B23K 26/0006;
(Continued)

(56) References Cited

U.S. PATENT DOCUMENTS 3,192,078 A * 6/1965 Gordon ................ H01F 1/0306
148/100
3,647,575 A * 3/1972 Fiedler et al. ....... C21D 8/1294
148/111
(Continued)

FOREIGN PATENT DOCUMENTS

CN 1216072 A 5/1999
CN 1474730 A 2/2004
(Continued)

OTHER PUBLICATIONS

International Search Report issued in PCT/JP2014/067754 (PCT/ISA/210), dated Oct. 7, 2014.
(Continued)

*Primary Examiner* — Eric S Stapleton
(74) *Attorney, Agent, or Firm* — Birch, Stewart, Kolasch & Birch, LLP

(57) ABSTRACT

In a laser processing apparatus for refining magnetic domains of a grain-oriented electromagnetic steel sheet by setting a laser beam to be focused on the grain-oriented electromagnetic steel sheet and scanned in a scanning direction, the laser beam focused on the grain-oriented electromagnetic steel sheet is linearly polarized light, and an angle between a linear polarization direction and the scanning direction is higher than 45° and equal to or lower than 90°.

17 Claims, 11 Drawing Sheets

(51) Int. Cl.
| | |
|---|---|
| *B23K 26/356* | (2014.01) |
| *C21D 10/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *H01F 1/16* | (2006.01) |
| *C21D 8/12* | (2006.01) |

(52) U.S. Cl.
CPC ............ *C21D 8/12* (2013.01); *C21D 10/005* (2013.01); *C22C 38/001* (2013.01); *C22C 38/002* (2013.01); *C22C 38/02* (2013.01); *C22C 38/04* (2013.01); *C22C 38/06* (2013.01); *H01F 1/16* (2013.01); *C22C 38/00* (2013.01)

(58) Field of Classification Search
CPC ............ B23K 26/0604; B23K 26/0738; B23K 26/352; B23K 26/0821; B23K 2103/04; B23K 2101/18; C21D 8/12; C21D 10/005; C21D 6/008; C21D 9/46; C21D 8/1294; C22C 38/06; C22C 38/02; C22C 38/04; C22C 38/002; C22C 38/001; C22C 38/00; H01F 1/16
USPC .................................... 219/121.73
See application file for complete search history.

(56) References Cited

U.S. PATENT DOCUMENTS

| | | | | | |
|---|---|---|---|---|---|
| 3,663,108 | A | * | 5/1972 | Yamamuro | G01B 11/046 356/637 |
| 3,848,104 | A | * | 11/1974 | Locke | C21D 1/09 219/121.65 |
| 3,856,568 | A | * | 12/1974 | Tanaka | H01F 1/14783 427/330 |
| 3,947,053 | A | * | 3/1976 | Sittmann | A63C 9/0805 280/623 |
| 3,990,923 | A | * | 11/1976 | Takashina | C21D 8/1294 148/111 |
| 4,063,063 | A | * | 12/1977 | Funck | B08B 7/0042 219/121.76 |
| 4,157,923 | A | * | 6/1979 | Yen | B23K 35/286 148/512 |
| 4,169,976 | A | * | 10/1979 | Cirri | B23K 26/06 219/121.72 |
| 4,293,350 | A | * | 10/1981 | Ichiyama | C21D 8/1294 148/111 |
| 4,304,978 | A | * | 12/1981 | Saunders | C21D 1/09 219/121.12 |
| 4,358,659 | A | * | 11/1982 | Spohnheimer | H01L 21/268 219/121.62 |
| 4,363,677 | A | * | 12/1982 | Ichiyama | C21D 1/09 148/111 |
| 4,378,480 | A | * | 3/1983 | Langhans | B23K 26/067 219/121.7 |
| 4,414,038 | A | * | 11/1983 | Dausinger | B23K 26/18 148/565 |
| 4,456,812 | A | * | 6/1984 | Neiheisel | B23K 26/0821 219/121.85 |
| 4,468,551 | A | * | 8/1984 | Neiheisel | B23K 26/0846 219/121.6 |
| 4,500,771 | A | * | 2/1985 | Miller | B23K 26/0846 219/121.68 |
| 4,534,804 | A | * | 8/1985 | Cade | H01L 21/268 257/620 |
| 4,535,218 | A | * | 8/1985 | Krause | B23K 26/073 219/121.68 |
| 4,541,035 | A | * | 9/1985 | Carlson | H01L 23/5383 361/792 |
| 4,589,190 | A | * | 5/1986 | Anthony | H01L 21/268 257/330 |
| 4,618,380 | A | * | 10/1986 | Alcorn | H01L 21/268 438/73 |
| 4,623,406 | A | * | 11/1986 | Suga | C21D 8/1205 148/111 |
| 4,623,407 | A | * | 11/1986 | Suga | C21D 8/1205 148/111 |
| 4,625,167 | A | * | 11/1986 | Fitzpatrick | G01N 21/21 324/213 |
| 4,645,547 | A | * | 2/1987 | Krause | H01F 1/14783 148/111 |
| 4,683,365 | A | * | 7/1987 | Kasner | B23K 26/0643 219/121.63 |
| 4,685,980 | A | * | 8/1987 | Sato | C21D 1/09 148/304 |
| 4,835,361 | A | * | 5/1989 | Strom | B23K 26/08 219/121.68 |
| 4,937,424 | A | * | 6/1990 | Yasui | B23K 26/073 219/121.6 |
| 4,963,199 | A | * | 10/1990 | Pavlik | C21D 8/1294 148/307 |
| 5,053,704 | A | * | 10/1991 | Fitzpatrick | G01R 33/0322 324/235 |
| 5,057,664 | A | * | 10/1991 | Johnson | B23K 26/351 219/121.69 |
| 5,067,992 | A | * | 11/1991 | Pavlik | H01F 1/16 148/307 |
| 5,072,091 | A | * | 12/1991 | Nagata | B23K 26/073 219/121.68 |
| 5,089,062 | A | * | 2/1992 | Pavlik | C21D 8/1294 148/110 |
| 5,103,074 | A | * | 4/1992 | Watanabe | B23K 26/0736 219/121.68 |
| 5,109,149 | A | * | 4/1992 | Leung | B23K 26/06 219/121.69 |
| 5,131,957 | A | * | 7/1992 | Epstein | C21D 10/005 148/565 |
| 5,166,493 | A | * | 11/1992 | Inagawa | B23K 26/0604 219/121.71 |
| 5,180,448 | A | * | 1/1993 | Hyde | B23K 26/06 148/525 |
| 5,223,693 | A | * | 6/1993 | Zumoto | G03F 7/2006 219/121.68 |
| 5,237,150 | A | * | 8/1993 | Karube | B23K 26/0643 219/121.72 |
| 5,302,802 | A | * | 4/1994 | Fujinaga | B23K 26/0884 219/121.74 |
| 5,317,589 | A | * | 5/1994 | Ogawa | H01S 3/0818 372/101 |
| 5,321,227 | A | * | 6/1994 | Fuchs | B23K 26/0738 219/121.68 |
| 5,356,081 | A | * | 10/1994 | Sellar | B23K 26/142 241/1 |
| 5,413,641 | A | * | 5/1995 | Coulon | B23K 26/123 148/224 |
| 5,446,378 | A | * | 8/1995 | Reich | G01N 21/21 324/225 |
| 5,468,308 | A | * | 11/1995 | Braza | C21D 1/09 148/321 |
| 5,483,038 | A | * | 1/1996 | Ota | B28D 1/221 219/121.69 |
| 5,484,980 | A | * | 1/1996 | Pratt | B23K 26/08 219/121.65 |
| 5,543,365 | A | * | 8/1996 | Wills | H01L 21/78 438/462 |
| 5,583,690 | A | * | 12/1996 | Andrae | G01N 21/21 359/368 |
| 5,589,090 | A | * | 12/1996 | Song | B23K 26/032 219/121.62 |
| 5,593,606 | A | * | 1/1997 | Owen | B23K 26/389 219/121.71 |
| 5,601,662 | A | * | 2/1997 | Hirai | G01L 3/102 148/100 |
| 5,663,652 | A | * | 9/1997 | Freeman | G01R 1/071 324/754.23 |
| 5,664,359 | A | * | 9/1997 | Sabranski | F41A 21/22 42/78 |

(56) References Cited

U.S. PATENT DOCUMENTS

| | | | | |
|---|---|---|---|---|
| 5,670,069 A * | 9/1997 | Nakai | ............... | B23K 26/066 |
| | | | | 219/121.64 |
| 5,739,048 A * | 4/1998 | Kerth | ............... | G11B 5/3106 |
| | | | | 216/22 |
| 5,744,780 A * | 4/1998 | Chang | ............... | B23K 26/032 |
| | | | | 219/121.73 |
| 5,751,585 A * | 5/1998 | Cutler | ............... | H05K 3/0038 |
| | | | | 700/161 |
| 5,779,753 A * | 7/1998 | Vetter | ............... | B23K 26/032 |
| | | | | 65/105 |
| 5,811,754 A * | 9/1998 | Nakatani | ............... | B23K 26/043 |
| | | | | 219/121.83 |
| 5,841,099 A * | 11/1998 | Owen | ............... | B23K 26/389 |
| | | | | 219/121.69 |
| 5,843,363 A * | 12/1998 | Mitwalsky | ............... | B23K 26/18 |
| | | | | 264/400 |
| 5,847,960 A * | 12/1998 | Cutler | ............... | B23K 26/0853 |
| | | | | 700/187 |
| 5,864,430 A * | 1/1999 | Dickey | ............... | G02B 27/09 |
| | | | | 359/559 |
| 5,870,421 A * | 2/1999 | Dahm | ............... | H01L 21/304 |
| | | | | 372/75 |
| 5,872,684 A * | 2/1999 | Hadfield | ............... | G11B 5/105 |
| | | | | 360/235.4 |
| 5,886,320 A * | 3/1999 | Gallo | ............... | H01L 23/5258 |
| | | | | 219/121.72 |
| 5,894,220 A * | 4/1999 | Wellstood | ............... | G01R 27/2623 |
| | | | | 324/248 |
| 5,911,890 A * | 6/1999 | Dulaney | ............... | B23K 26/0648 |
| | | | | 219/121.85 |
| 5,948,172 A * | 9/1999 | Neiheisel | ............... | B23K 26/064 |
| | | | | 134/1 |
| 5,963,364 A * | 10/1999 | Leong | ............... | B23K 26/0648 |
| | | | | 359/352 |
| 5,969,517 A * | 10/1999 | Rao | ............... | G01R 15/245 |
| | | | | 324/244.1 |
| 6,034,349 A * | 3/2000 | Ota | ............... | B23K 26/067 |
| | | | | 219/121.68 |
| 6,037,565 A * | 3/2000 | Hackel | ............... | B23K 26/0676 |
| | | | | 219/121.68 |
| 6,060,684 A * | 5/2000 | Moriike | ............... | B23K 26/066 |
| | | | | 219/121.75 |
| 6,091,047 A | 7/2000 | Miyakawa et al. | | |
| 6,114,651 A * | 9/2000 | Schluter | ............... | B08B 15/04 |
| | | | | 219/121.68 |
| 6,130,009 A * | 10/2000 | Smith | ............... | B41J 2/162 |
| | | | | 219/121.7 |
| 6,141,093 A * | 10/2000 | Argyle | ............... | G01N 21/21 |
| | | | | 324/523 |
| 6,226,354 B1 * | 5/2001 | Mamine | ............... | H05G 2/00 |
| | | | | 378/119 |
| 6,356,337 B1 * | 3/2002 | Zemel | ............... | G03B 27/32 |
| | | | | 355/26 |
| 6,359,686 B1 * | 3/2002 | Ariglio | ............... | G01N 21/896 |
| | | | | 356/239.1 |
| 6,368,424 B1 | 4/2002 | Sakai et al. | | |
| 6,376,797 B1 * | 4/2002 | Piwczyk | ............... | B23K 26/12 |
| | | | | 219/121.72 |
| 6,420,245 B1 * | 7/2002 | Manor | ............... | B23K 26/0093 |
| | | | | 438/460 |
| 6,469,275 B2 * | 10/2002 | Dulaney | ............... | B23K 26/06 |
| | | | | 219/121.85 |
| 6,521,866 B1 * | 2/2003 | Arai | ............... | B23K 26/0622 |
| | | | | 219/121.73 |
| 6,548,125 B2 * | 4/2003 | Warnecke | ............... | B23K 26/342 |
| | | | | 427/597 |
| 6,640,604 B2 * | 11/2003 | Matsushita | ............... | B21D 11/20 |
| | | | | 219/121.73 |
| 6,720,524 B1 * | 4/2004 | Hamada | ............... | B23K 26/082 |
| | | | | 219/121.7 |
| 6,818,858 B2 * | 11/2004 | Yasoda | ............... | B23K 26/18 |
| | | | | 219/121.7 |
| 6,934,068 B2 * | 8/2005 | Kochergin | ............... | G02F 1/09 |
| | | | | 359/280 |
| 6,970,644 B2 * | 11/2005 | Koren | ............... | C23C 16/481 |
| | | | | 118/724 |
| 6,984,802 B2 * | 1/2006 | Kuroiwa | ............... | B23K 26/382 |
| | | | | 219/121.73 |
| 7,015,422 B2 * | 3/2006 | Timans | ............... | F27B 17/0025 |
| | | | | 219/390 |
| 7,054,051 B1 * | 5/2006 | Bloom | ............... | G02B 26/06 |
| | | | | 359/276 |
| 7,157,038 B2 * | 1/2007 | Baird | ............... | B23K 26/364 |
| | | | | 264/400 |
| 7,259,082 B2 * | 8/2007 | Tanaka | ............... | H01L 21/02595 |
| | | | | 438/487 |
| 7,265,845 B2 * | 9/2007 | Kochergin | ............... | G01N 21/553 |
| | | | | 324/244.1 |
| 7,348,517 B2 * | 3/2008 | Egawa | ............... | B23K 26/06 |
| | | | | 219/121.67 |
| 7,416,621 B2 * | 8/2008 | Knott | ............... | C21D 1/09 |
| | | | | 148/565 |
| 7,442,260 B2 * | 10/2008 | Sakai | ............... | C21D 8/1294 |
| | | | | 148/110 |
| 7,623,246 B2 * | 11/2009 | Ho | ............... | G01N 21/45 |
| | | | | 356/492 |
| 7,638,729 B2 * | 12/2009 | Park | ............... | B23K 26/0676 |
| | | | | 219/121.67 |
| 7,887,645 B1 * | 2/2011 | Schoen | ............... | C21D 8/1233 |
| | | | | 148/111 |
| 8,016,951 B2 * | 9/2011 | Arai | ............... | H01F 1/16 |
| | | | | 148/308 |
| 8,034,196 B2 * | 10/2011 | Iwata | ............... | C22C 38/02 |
| | | | | 148/308 |
| 8,088,615 B2 * | 1/2012 | Ausserre | ............... | G01N 21/21 |
| | | | | 435/287.2 |
| 8,143,552 B2 * | 3/2012 | Nomaru | ............... | B23K 26/066 |
| | | | | 219/121.67 |
| 8,173,931 B2 * | 5/2012 | Wen | ............... | B23K 26/40 |
| | | | | 219/121.7 |
| 8,187,983 B2 * | 5/2012 | Wood | ............... | H01L 21/3221 |
| | | | | 438/795 |
| RE43,487 E * | 6/2012 | O'Brien | ............... | B23K 26/40 |
| | | | | 264/400 |
| 8,277,574 B2 * | 10/2012 | Sakai | ............... | H01F 1/16 |
| | | | | 148/113 |
| 8,289,818 B2 * | 10/2012 | Taratorin | ............... | G01R 33/032 |
| | | | | 369/13.13 |
| 8,327,666 B2 * | 12/2012 | Harvey | ............... | C03C 3/093 |
| | | | | 65/112 |
| 8,341,976 B2 * | 1/2013 | Dejneka | ............... | C03B 33/0222 |
| | | | | 65/112 |
| 8,427,929 B2 * | 4/2013 | Patland | ............... | G11B 5/455 |
| | | | | 369/126 |
| 8,497,449 B1 * | 7/2013 | Budd | ............... | B23K 26/0853 |
| | | | | 219/121.69 |
| 8,525,075 B2 * | 9/2013 | Tanaka | ............... | C30B 11/005 |
| | | | | 219/121.73 |
| 8,659,291 B2 * | 2/2014 | Heidmann | ............... | G11B 5/455 |
| | | | | 324/244.1 |
| 8,895,890 B2 * | 11/2014 | Baistrocchi | ............... | B23K 26/364 |
| | | | | 219/121.67 |
| 9,139,886 B2 * | 9/2015 | Sakai | ............... | B23K 26/0006 |
| 9,346,123 B2 * | 5/2016 | Okabe | ............... | C22C 38/04 |
| 9,799,432 B2 * | 10/2017 | Yamaguchi | ............... | C22C 38/34 |
| 2001/0034564 A1 * | 10/2001 | Jones | ............... | B23K 26/073 |
| | | | | 700/166 |
| 2002/0033558 A1 * | 3/2002 | Fahey | ............... | B23K 26/40 |
| | | | | 264/400 |
| 2002/0149136 A1 * | 10/2002 | Baird | ............... | B23K 26/364 |
| | | | | 264/400 |
| 2002/0190435 A1 | 12/2002 | O'Brien et al. | | |
| 2003/0000930 A1 * | 1/2003 | Hamada | ............... | G03F 1/20 |
| | | | | 219/121.73 |
| 2003/0080099 A1 * | 5/2003 | Tanaka | ............... | H01L 21/02592 |
| | | | | 219/121.73 |
| 2003/0085720 A1 * | 5/2003 | Yamazaki | ............... | H01L 21/02422 |
| | | | | 438/166 |

(56) References Cited

U.S. PATENT DOCUMENTS

| | | | | |
|---|---|---|---|---|
| 2003/0089691 A1* | 5/2003 | Tanaka | ............... | B23K 26/0732 219/121.67 |
| 2003/0141287 A1* | 7/2003 | Tanaka | ................. | B23K 26/067 219/121.73 |
| 2003/0143337 A1* | 7/2003 | Tanaka | ............... | H01L 21/02678 427/508 |
| 2004/0069751 A1* | 4/2004 | Yamazaki | ......... | H01L 29/78675 219/121.6 |
| 2004/0084607 A1* | 5/2004 | Ichihashi | ........... | G02B 27/0955 250/216 |
| 2004/0104208 A1* | 6/2004 | Ijima | .................... | B23K 26/382 219/121.77 |
| 2004/0119955 A1* | 6/2004 | Tanaka | ............... | B23K 26/0732 355/51 |
| 2004/0140297 A1* | 7/2004 | Tanaka | ............... | B23K 26/0661 219/121.6 |
| 2004/0169023 A1* | 9/2004 | Tanaka | ................ | H01L 27/1285 219/121.73 |
| 2004/0171237 A1* | 9/2004 | Tanaka | .............. | H01L 21/02532 438/487 |
| 2004/0195222 A1* | 10/2004 | Tanaka | ................. | B23K 26/073 219/121.73 |
| 2004/0198028 A1* | 10/2004 | Tanaka | ............... | B23K 26/0853 438/487 |
| 2004/0218249 A1* | 11/2004 | Kochergin | ................ | G02F 1/09 359/280 |
| 2004/0222197 A1* | 11/2004 | Hiramatsu | ........... | B23K 26/067 219/121.7 |
| 2004/0253838 A1* | 12/2004 | Yamazaki | .......... | B23K 26/0604 438/795 |
| 2005/0121427 A1* | 6/2005 | Mikata | ................. | B23K 26/073 219/121.73 |
| 2005/0139786 A1* | 6/2005 | Tanaka | ..................... | C30B 13/24 250/492.2 |
| 2005/0157762 A1* | 7/2005 | DeMaria | ............ | B23K 26/0732 372/9 |
| 2005/0237895 A1* | 10/2005 | Tanaka | .............. | H01L 21/02691 369/97 |
| 2005/0263498 A1* | 12/2005 | Hiramatsu | ........... | B23K 26/082 219/121.7 |
| 2006/0000814 A1 | 1/2006 | Gu et al. | | |
| 2006/0076326 A1* | 4/2006 | Kobayashi | ......... | B23K 26/0613 219/121.73 |
| 2006/0079040 A1* | 4/2006 | Tanaka | ................. | H01L 21/268 438/166 |
| 2006/0102602 A1* | 5/2006 | Dane | ................. | B23K 26/0884 219/121.73 |
| 2006/0102604 A1* | 5/2006 | Dane | .................... | B23K 26/032 219/121.74 |
| 2006/0102609 A1* | 5/2006 | Dane | .................... | B23K 26/702 219/121.85 |
| 2006/0169362 A1* | 8/2006 | Sakai | .................... | C21D 8/1294 148/110 |
| 2007/0062919 A1* | 3/2007 | Hamada | ............. | B23K 26/0626 219/121.71 |
| 2007/0075059 A1* | 4/2007 | Arai | ..................... | B23K 26/067 219/121.71 |
| 2007/0131962 A1* | 6/2007 | Yazaki | ................. | B23K 26/032 257/103 |
| 2007/0138151 A1* | 6/2007 | Tanaka | ................. | B23K 26/082 219/121.65 |
| 2007/0151963 A1* | 7/2007 | Tanaka | ............... | B23K 26/1438 219/121.78 |
| 2007/0228100 A1* | 10/2007 | Gonoe | ................. | B28D 5/0011 225/1 |
| 2008/0061043 A1* | 3/2008 | Fujii | ................. | B23K 26/0604 219/121.69 |
| 2009/0107585 A1* | 4/2009 | Sakai | ................. | B23K 26/0006 148/121 |
| 2009/0114316 A1* | 5/2009 | Sakai | ................. | B23K 26/0626 148/100 |
| 2011/0008973 A1* | 1/2011 | Kawaguchi | ........ | B23K 26/0738 438/795 |
| 2011/0180521 A1* | 7/2011 | Quitter | ............... | B23K 26/0622 219/121.73 |
| 2012/0012762 A1* | 1/2012 | Nowak | .............. | G02B 27/1086 250/504 R |
| 2012/0135607 A1* | 5/2012 | Shimoi | ................ | B23K 26/382 438/705 |
| 2012/0135608 A1* | 5/2012 | Shimoi | ................ | B23K 26/382 438/705 |
| 2013/0146572 A1* | 6/2013 | Watanabe | .......... | B23K 26/0648 219/121.72 |
| 2013/0148674 A1* | 6/2013 | Nowak | .................. | B82Y 20/00 372/26 |
| 2013/0161301 A1* | 6/2013 | Okabe | ................. | C22C 38/008 219/121.85 |
| 2014/0312009 A1* | 10/2014 | Okabe | ..................... | C22C 38/00 219/121.29 |
| 2015/0038313 A1* | 2/2015 | Hosseini | ................ | B23K 26/38 501/32 |
| 2015/0253242 A1* | 9/2015 | Ito | ........................... | H01F 41/02 148/121 |
| 2015/0318091 A1* | 11/2015 | Hirano | .................. | C22C 38/001 148/112 |
| 2017/0136575 A1* | 5/2017 | Hirano | .................... | C22C 38/06 |
| 2017/0157706 A1* | 6/2017 | Hirano | ..................... | H01F 1/16 |

FOREIGN PATENT DOCUMENTS

| | | |
|---|---|---|
| CN | 101297050 A | 10/2008 |
| CN | 101415847 A | 4/2009 |
| CN | 103025473 A | 4/2013 |
| CN | 103433618 A | 12/2013 |
| EP | 0069383 A1 | 1/1983 |
| EP | 0100638 A2 | 2/1984 |
| EP | 0897016 A1 | 2/1999 |
| JP | 58-29592 A | 2/1983 |
| JP | 59/33802 A | 2/1984 |
| JP | 63-83227 A | 4/1988 |
| JP | 2-52192 A | 2/1990 |
| JP | 2007-119821 A | 5/2007 |
| JP | 2013-71148 A | 4/2013 |
| RU | 2371487 C1 | 10/2009 |
| RU | 2400542 C1 | 9/2010 |
| WO | WO 2004/083465 A1 | 9/2004 |
| WO | WO 2010/042833 A1 | 4/2010 |
| WO | WO 2014/050907 A1 | 4/2014 |
| WO | WO 2014/073599 A1 | 5/2014 |

OTHER PUBLICATIONS

Written Opinion of the International Searching Authority issued in PCT/JP2014/067754 (PCT/ISA/237), dated Oct. 7, 2014.
Russian Office Action and Search Report for counterpart Russian Application No. 2016151358, dated Feb. 19, 2018, with English translations.
Extended European Search Report, dated Dec. 22, 2017, for counterpart European Application No. 14896916.5.
Chinese Office Action and Search Report issued in Chinese Application No. 201480080155.9 dated Oct. 31, 2017, together with an English translation.
Brazilian Office Action and Search Report dated Jun. 11, 2019, for counterpart Brazilian Application No. 112016030522-1, with English translation.

* cited by examiner

LASER PROCESSING APPARATUS

TECHNICAL FIELD OF THE INVENTION

The present invention relates to a laser processing apparatus which irradiates laser beams on a grain-oriented electromagnetic steel sheet used for the core of a transformer or the like thereby refining magnetic domains.

RELATED ART

A grain-oriented electromagnetic steel sheet is easily magnetized in the rolling direction during the production of the steel sheet. Therefore, the grain-oriented electromagnetic steel sheet is also called a unidirectional electromagnetic steel sheet. The grain-oriented electromagnetic steel sheet is used as a material for forming the core of an electrical device such as a transformer or a rotary machine.

When the grain-oriented electromagnetic steel sheet is magnetized, energy loss such as core loss is generated. In recent years, due to the progress of global warming, energy-saving electrical devices have been required worldwide. Therefore, a technology for further reducing the core loss in a grain-oriented electromagnetic steel sheet is necessary.

Core loss is classified into eddy-current loss and hysteresis loss. Eddy-current loss is classified into classical eddy-current loss and anomalous eddy-current loss. For reducing classical eddy-current loss, a grain-oriented electromagnetic steel sheet which has an insulating coating film formed at the surface and has a small sheet thickness is known. For example, Patent Document 1 mentioned below discloses a grain-oriented electromagnetic steel sheet which includes a glass film formed on the surface of a steel sheet base steel material, and an insulating coating film formed on the surface of the glass coating film.

For example, Patent Documents 2 and 3 mentioned below disclose a laser magnetic domain control method capable of suppressing anomalous eddy-current loss. In the laser magnetic domain control method, the surface of a grain-oriented electromagnetic steel sheet in which an insulating coating film is formed is irradiated with a laser beam and the laser beam is scanned substantially along a width direction of the grain-oriented electromagnetic steel sheet (that is, a direction substantially perpendicular to the rolling direction of the grain-oriented electromagnetic steel sheet). As a result, a number of residual strains are periodically formed along the rolling direction on the surface of the grain-oriented electromagnetic steel sheet (that is, the surface of the base steel material) such that magnetic domains of the grain-oriented electromagnetic steel sheet are refined.

According to the laser magnetic domain control method, a thermal history having a steep temperature gradient along a thickness direction is generated in the outermost surface of the grain-oriented electromagnetic steel sheet through the scanning with the laser beam. Since the thermal history is given, residual strains are generated on the surface of the base steel material of the grain-oriented electromagnetic steel sheet, and circulating current magnetic domains are formed due to the residual strains. Intervals between 180° domain walls are refined by the circulating current magnetic domains, and as a result, anomalous eddy-current loss in the grain-oriented electromagnetic steel sheet is reduced.

As described above, intervals between 180° domain walls are refined by the circulating current magnetic domains formed on the surface of the base steel material, and as a result, anomalous eddy-current loss is reduced. However, the circulating current magnetic domains formed on the surface of the base steel material cause an increase in hysteresis loss. Therefore, in order to minimize core loss including eddy-current loss and hysteresis loss, it is effective to reduce the width of the circulating current magnetic domains. For example, Patent Document 3 discloses a method in which strong strains are formed in a narrow region by using a $TEM_{00}$ mode laser beam, which enables a very small beam spot size by its excellent focusing characteristics, such that circulating current magnetic domains which are narrow and have sufficient strength are obtained.

In a laser irradiation process of the laser magnetic domain control method, magnetic domain control is performed by forming the insulating coating film on the glass coating film and emitting the laser beam toward the upper side of the insulating coating film. Here, due to an increase in temperature caused by the laser beam irradiation, defects may be generated on the insulating coating film and the glass coating film. Here, defects mean film damage such as defective peeling, swelling, alteration, and discoloration of the insulating coating film and the glass coating film. In a case where defects are generated in the glass coating film, the steel sheet base steel material is exposed to the outside, and there is concern that rust may be generated. Therefore, in a case where defects are generated in the glass coating film, the insulating coating film needs to be applied again, which causes an addition of a process and an increase in production costs.

During the production of the grain-oriented electromagnetic steel sheet, many heat treatments are performed, and the interface structure and thickness of the glass coating film or the insulating coating film may vary in the rolling direction and width direction of the steel sheet base steel material. Therefore, it may be difficult to suppress the generation of defects in the glass coating film over the entire steel sheet base steel material even when laser conditions are adjusted.

PRIOR ART DOCUMENT

Patent Document

[Patent Document 1] Japanese Unexamined Patent Application, First Publication No. 2007-119821

[Patent Document 2] Japanese Unexamined Patent Application, First Publication No. S59-33802

[Patent Document 3] PCT International Publication No. WO2004/083465

[Patent Document 4] Japanese Unexamined Patent Application, First Publication No. S58-29592

[Patent Document 5] Japanese Unexamined Patent Application, First Publication No. H2-52192

DISCLOSURE OF THE INVENTION

Problems to be Solved by the Invention

However, regarding laser magnetic domain control in the related art, a property of a laser beam that is absorbed by a steel sheet varies depending on whether or not an insulating coating film is transparent at the wavelength of the laser beam which is emitted. In a case where the insulating coating film is opaque to the wavelength of the laser beam, the laser beam is absorbed by the insulating coating film. In addition, regarding the propagation of a laser beam, it is known that as the propagation distance (hereinafter, also referred to as a path length) of the laser beam within a material that absorbs the laser beam increases, the absorbed laser beam power increases.

In addition, in a case of laser magnetic domain control in which a laser beam having a wavelength that is not transmitted by an insulating coating film is used, the following problems have incurred. That is, in order to perform scanning the laser beam rapidly and efficiently, an optical system which linearly scans a single laser beam from a position at a predetermined height from the surface of a grain-oriented electromagnetic steel sheet onto the grain-oriented electromagnetic steel sheet along a width direction thereof is used.

In a case where this optical system is used, the laser beam is incident perpendicular to the surface of the grain-oriented electromagnetic steel sheet at a center portion of the laser scanning width. That is, in a case where the incident position of the laser beam is coincident with the center portion of the laser scanning width, the angle between the direction perpendicular (normal direction) to the surface of the grain-oriented electromagnetic steel sheet and the propagation direction of the laser beam (an incident angle $\phi$ of the laser beam) becomes 0°. On the other hand, as the incident position of the laser beam approaches an end portion of the laser scanning width, the incident angle $\phi$ of the laser beam increases.

In such an optical system, as the incident position of the laser beam approaches the end portion apart from the center portion of the laser scanning width (as the incident angle $\phi$ of the laser beam increases), the path length of the laser beam in the insulating coating film and the glass coating film increases, and thus the amount of the laser beam absorbed by the insulating coating film increases. Therefore, a higher power is absorbed at the end portion of the laser scanning width in the steel sheet than at the center portion. Consequently, the risk of generating defects in the glass coating film increases.

In order to solve this problem, reducing the absorptance of the laser beam at the end portion of the laser scanning width may be considered. Regarding this, for example, as disclosed in Patent Documents 4 and 5 mentioned above, a technology in which the incident angle of a laser beam (linearly polarized light) is fixed to an angle close to the Brewster's angle (for example, an angle of 45° or higher, referring to Claim 3 of Patent Document 4 and Claim 1 of Patent Document 5) such that the surface of a processing object is irradiated with the laser beam in a state in which the absorptance of the laser beam is always maximized has been hitherto known. However, a technology for actively reducing the absorptance of a laser beam at a specific irradiation position has not been required in the related art.

The present invention has been made taking the foregoing circumstances into consideration, and an object thereof is to provide a laser processing apparatus capable of suppressing the generation of defects in a glass coating film.

Means for Solving the Problem

In order to achieve the object of solving the problems, the present invention employs the following measures.

(1) An aspect of the present invention provides a laser processing apparatus for refining magnetic domains of a grain-oriented electromagnetic steel sheet by setting a laser beam to be focused on the grain-oriented electromagnetic steel sheet and scanned in a scanning direction, in which the laser beam focused on the grain-oriented electromagnetic steel sheet is linearly polarized light, and an angle between a linear polarization direction and the scanning direction is higher than 45° and equal to or lower than 90°.

(2) In the laser processing apparatus described in (1), a maximum incident angle $\phi_{MAX}$ of the laser beam incident on the grain-oriented electromagnetic steel sheet may satisfy the following conditional expression (1).

$$1/\cos \phi_{MAX} \leq 1.19 \quad (1)$$

(3) In the laser processing apparatus described in (1) or (2), a wavelength of the laser beam focused on the grain-oriented electromagnetic steel sheet may be higher than 7 μm.

(4) The laser processing apparatus described in any one of (1) to (3) may further include a laser oscillator which emits the laser beam, and the laser oscillator may be a $CO_2$ laser which emits linearly polarized light.

(5) In the laser processing apparatus described in any one of (1) to (4), a shape of the laser beam focused on the grain-oriented electromagnetic steel sheet may be an ellipse, and a minor axis direction of the ellipse may be perpendicular to the scanning direction.

Effects of the Invention

According to the aspect, the generation of defects in the glass coating film can be suppressed.

EMBODIMENT OF THE INVENTION

Figure 1:
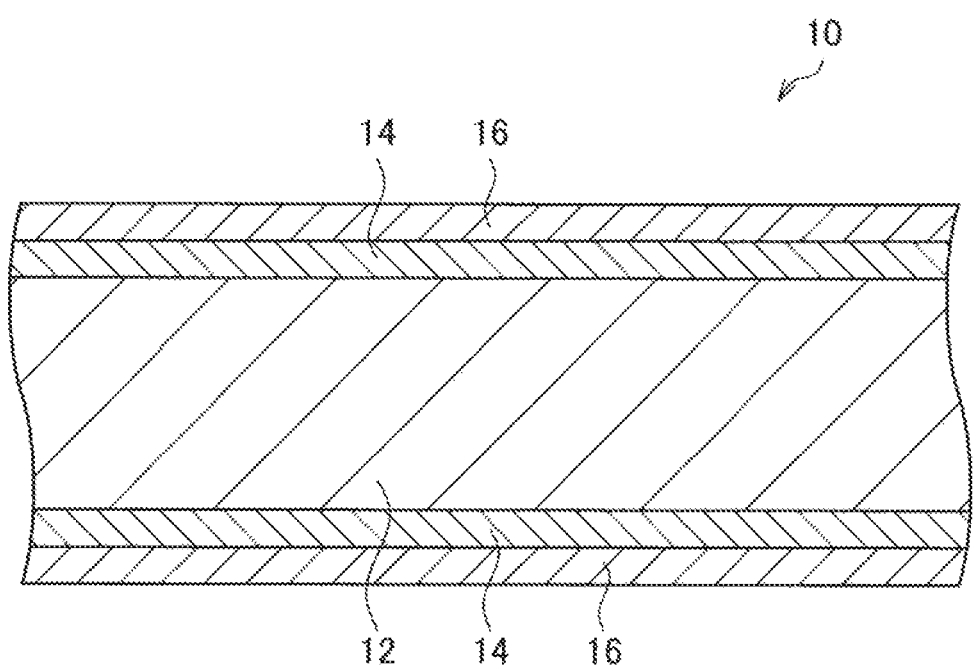
FIG. 1 is a sectional view of a grain-oriented electromagnetic steel sheet 10 according to an embodiment of the present invention.

An embodiment of the present invention will be described in detail below with reference to the accompanying drawings. In the specification and the drawings, elements which have substantially the same functional configurations are denoted by the same reference numerals, and corresponding descriptions will not be repeated.

<Summary of Grain-Oriented Electromagnetic Steel Sheet>

A grain-oriented electromagnetic steel sheet is an electromagnetic steel sheet in which the easy magnetization axis of grains of the steel sheet (<100> direction of a body-centered cubic crystal) is substantially aligned with the rolling direction in a production process. In the grain-oriented electromagnetic steel sheet described above, a number of magnetic domains of which the magnetization direction aligns with the rolling direction are arranged and these magnetic domains are separated by domain walls. The grain-oriented electromagnetic steel sheet is easily magnetized in the rolling direction and is thus appropriate as the core material of a transformer in which the directions of lines of magnetic forces are substantially constant.

A core for a transformer is roughly classified into a wound core and a stacked core. In a production process of a wound core, a steel sheet is assembled into the shape of the core while winding deformation is given thereto, and thereafter annealing is performed on the resultant in order to remove strains introduced due to the mechanical deformation. However, in the annealing process, as described above, strains introduced due to laser irradiation are also removed, and thus an effect of refining the magnetic domains is lost. On the other hand, in a production process of a stacked core, an annealing process for strain removal described above is unnecessary. Therefore, the grain-oriented electromagnetic steel sheet according to this embodiment is particularly appropriate as the material of stacked cores.

FIG. 1 is a sectional view of a grain-oriented electromagnetic steel sheet 10 according to this embodiment. As shown in FIG. 1, the grain-oriented electromagnetic steel sheet 10 includes a steel sheet body (base steel material) 12, glass coating films 14 formed on both surfaces of the steel sheet body 12, and insulating coating films 16 formed on the glass coating films 14.

The steel sheet body 12 is formed of an iron alloy containing Si. The composition of the steel sheet body 12 includes, as an example, Si: 2.5 mass % or more and 4.0 mass % or less, C: 0.02 mass % or more and 0.10 mass % or less, Mn: 0.05 mass % or more and 0.20 mass % or less, acid-soluble Al: 0.020 mass % or more and 0.040 mass % or less, N: 0.002 mass % or more and 0.012 mass % or less, S: 0.001 mass % or more and 0.010 mass % or less, P: 0.01 mass % or more and 0.04 mass % or less, and Fe and unavoidable impurities as the remainder. For example, the thickness of the steel sheet body 12 is 0.1 mm or greater and 0.4 mm or smaller.

For example, the glass coating film 14 is formed of complex oxides such as forsterite ($Mg_2SiO_4$), spinel ($MgAl_2O_4$), and cordierite ($Mg_2Al_4Si_5O_{16}$). For example, the thickness of the glass coating film 14 is 1 μm.

For example, the insulating coating film 16 is formed of a coating liquid primarily containing colloidal silica and phosphate (magnesium phosphate, aluminum phosphate, or the like), or a coating liquid in which alumina sol and boric acid are mixed together. For example, the thickness of the insulating coating film 16 is 2 μm or greater and 3 μm or smaller.

In the grain-oriented electromagnetic steel sheet 10 having the above-described configuration, a laser beam is emitted toward the upper side of the insulating coating film 16 such that residual strains are given to line-shaped regions substantially perpendicular to the rolling direction. The line-shaped regions to which the residual strains are given are formed at predetermined periods in the rolling direction. In regions which exist between two line-shaped regions and are magnetized in the rolling direction, magnetic domain widths in a direction substantially perpendicular to the rolling direction are refined.

<Production Method of Grain-Oriented Electromagnetic Steel Sheet>

Figure 2:
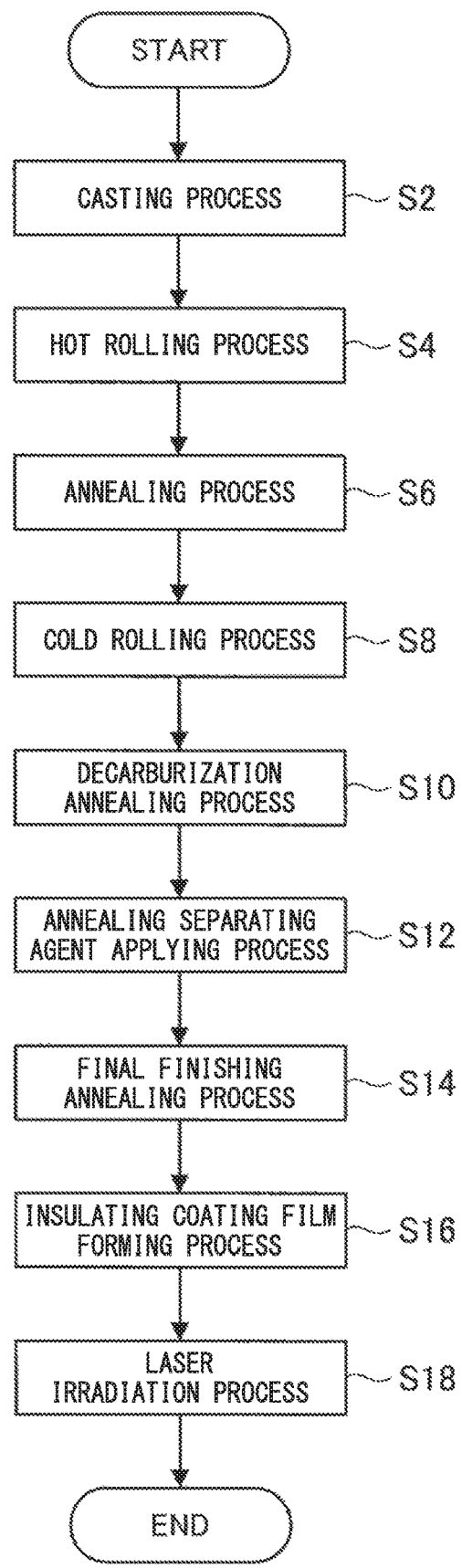
FIG. 2 is a flowchart showing an example of a production process of the grain-oriented electromagnetic steel sheet 10 according to an embodiment of the present invention.

A production method of the grain-oriented electromagnetic steel sheet 10 according to this embodiment will be described with reference to FIG. 2. FIG. 2 is a flowchart showing an example of a production process of the grain-oriented electromagnetic steel sheet 10 according to this embodiment.

As shown in FIG. 2, the production process of the grain-oriented electromagnetic steel sheet 10 includes a casting process S2, a hot rolling process S4, an annealing process S6, a cold rolling process S8, a decarburization annealing process S10, an annealing separating agent applying process S12, a final finishing annealing process S14, an insulating coating film forming process S16, and a laser irradiation process S18.

In the casting process S2, molten steel which is adjusted to have a predetermined composition is supplied to a continuous casting machine to continuously form an ingot. In the hot rolling process S4, hot rolling is performed by heating the ingot to a predetermined temperature (for example, 150° C. to 1400° C.). Accordingly, a hot rolled material having a predetermined thickness (for example, 1.8 to 3.5 mm) is formed.

In the annealing process S6, a heat treatment is performed on the hot rolled material, for example, under the condition of a heating temperature of 750° C. to 1200° C. and a heating time of 30 seconds to 10 minutes. In the cold rolling process S8, the surface of the hot rolled material is pickled, and thereafter cold rolling is performed thereon. Accordingly, a cold rolled material having a predetermined thickness (for example, 0.1 to 0.4 mm) is formed.

In the decarburization annealing process S10, a heat treatment is performed on the cold rolled material, for example, under the condition of a heating temperature of 700° C. to 900° C. and a heating time of 1 to 3 minutes, thereby forming the steel sheet body 12. An oxide film primarily containing silica ($SiO_2$) is formed on the surface of the steel sheet body 12. In the annealing separating agent applying process S12, an annealing separating agent primarily containing magnesia (MgO) is formed on the oxide layer of the steel sheet body 12.

In the final finishing annealing process S14, the steel sheet body 12 to which the annealing separating agent is applied is inserted into a batch type furnace in a state of being wound in a coil shape and is subjected to a heat treatment. The heat treatment conditions are, for example, a heating temperature of 1100° C. to 1300° C. and a heating time of 20 to 24 hours. At this time, so-called Goss grains of which the easy magnetization axis aligns with a transport direction (rolling direction) of the steel sheet body 12 preferentially grow. As a result, a grain-oriented electromagnetic steel sheet which has a high degree of crystal orientation (orientation) after the finishing annealing can be obtained. In addition, in the final finishing annealing process S14, the oxide layer and the annealing separating agent react with each other such that the glass coating film 14 formed of forsterite ($Mg_2SiO_4$) is formed on the surface of the steel sheet body 12.

In the insulating coating film forming process S16, the steel sheet body 12 which is wound in the coil shape is unwound and stretched into a plate shape so as to be transported. In addition, an insulating agent is applied onto the glass coating films 14 formed on both surfaces of the steel sheet body 12, and the resultant is baked, thereby forming the insulating coating films 16. The steel sheet body 12 on which the insulating coating films 16 are formed is wound in a coil shape.

In the laser irradiation process S18, the steel sheet body 12 which is wound in the coil shape is unwound and stretched into a plate shape so as to be transported. In addition, a laser beam is focused on and irradiates one surface of the steel sheet body 12 by a laser irradiation device, which will be described later, and the laser beam is scanned substantially along the width direction of the electromagnetic steel sheet transported in the rolling direction (transport direction). Accordingly, line-shaped strains which are substantially perpendicular to the rolling direction are formed on the surface of the steel sheet body 12 at predetermined intervals in the rolling direction. In addition, focusing and scanning of the laser beam may also be performed on both surfaces including the front surface and the rear surface of the steel sheet body 12. In addition, it is described above that the steel sheet body 12 on which the insulating coating films 16 are formed is wound in the coil shape and is then subjected to the laser irradiation process S18. However, laser irradiation may be performed immediately after the formation of the insulating coating films and thereafter the steel sheet body 12 may be wound in a coil shape.

In the production process described above, the grain-oriented electromagnetic steel sheet 10 in which the glass coating films 14 and the insulating coating films 16 are formed on the surface of the steel sheet body 12 and magnetic domains are controlled by laser irradiation is produced.

<Configuration of Laser Processing Apparatus>

Figure 3:
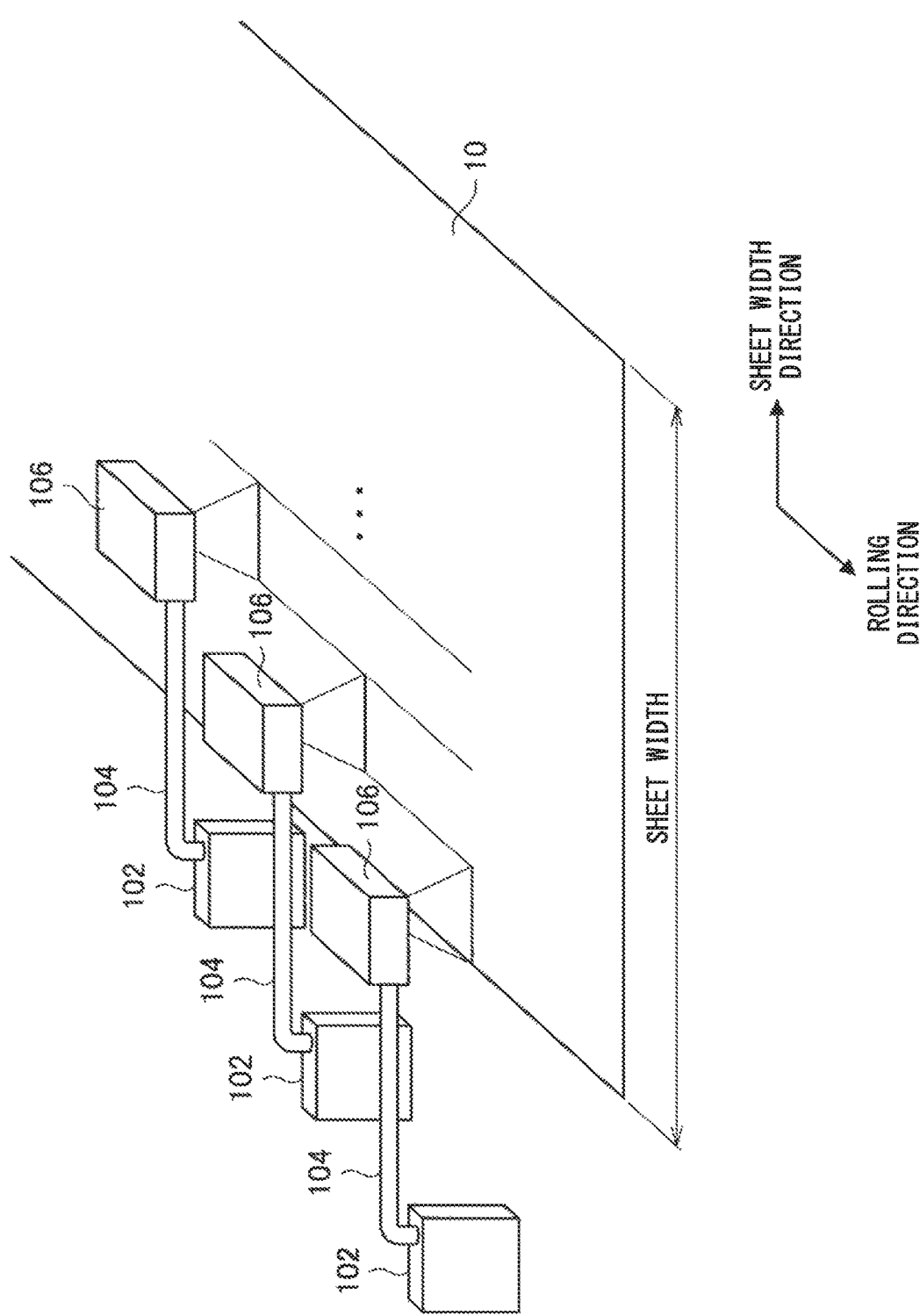
FIG. 3 is a schematic view showing an example of the configuration of a laser processing apparatus 100 according to an embodiment of the present invention.
Figure 4:
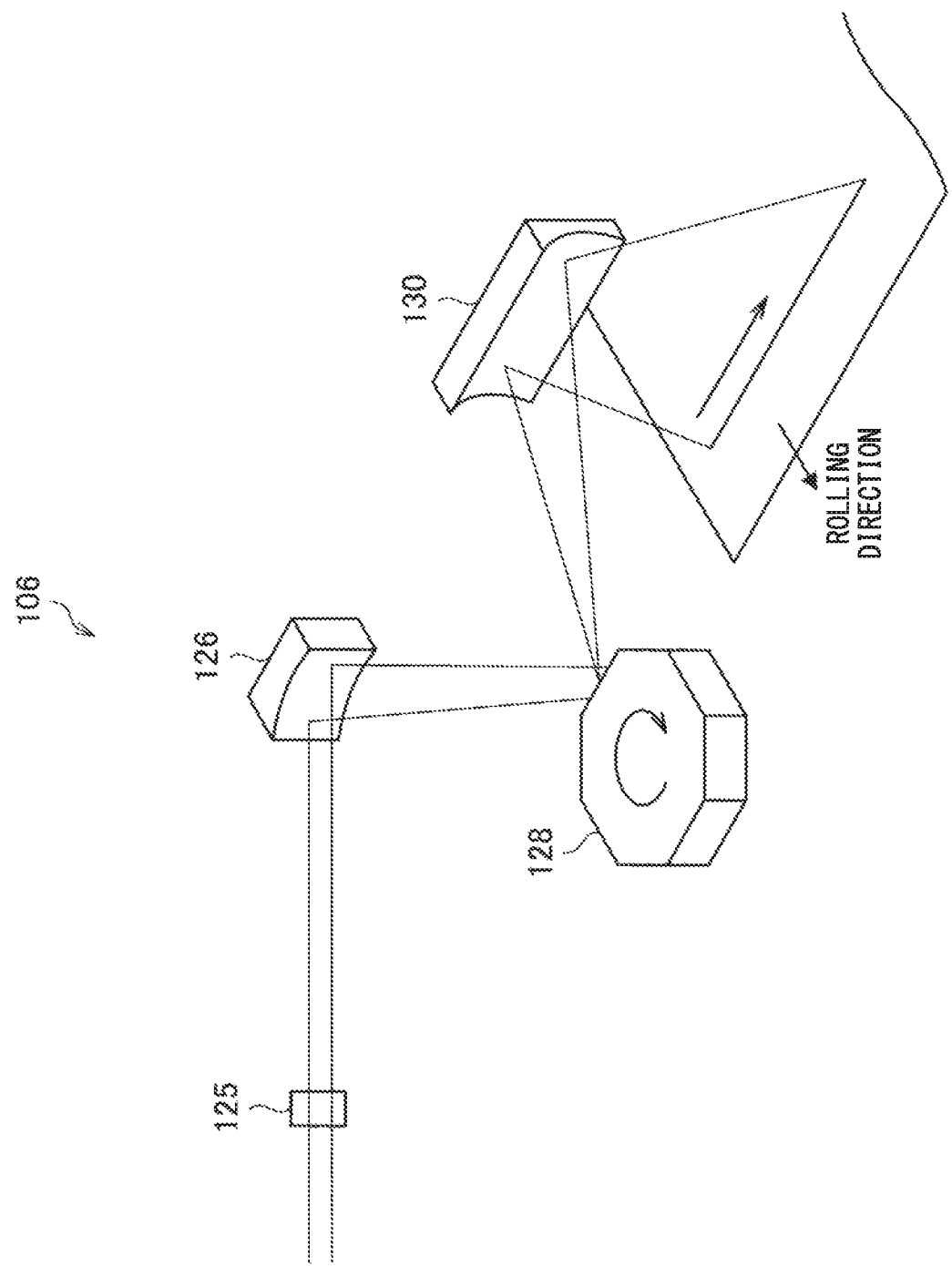
FIG. 4 is a schematic view showing an example of the configuration of a laser irradiation device 106 according to an embodiment of the present invention.

An example of the configuration of a laser processing apparatus 100 which irradiates the grain-oriented electromagnetic steel sheet 10 with a laser beam to generate residual strains will be described with reference to FIGS. 3 and 4. FIG. 3 is a schematic view showing an example of the configuration of the laser processing apparatus 100 according to this embodiment. FIG. 4 is a schematic view showing an example of the configuration of a single laser irradiation device 106.

The laser processing apparatus 100 emits the laser beam toward the upper side of the insulating coating film 16 of the grain-oriented electromagnetic steel sheet 10 transported in the rolling direction at a predetermined speed to generate line-shaped strains which extend substantially perpendicular to the rolling direction. As shown in FIG. 3, the laser processing apparatus 100 includes a number of laser oscillators 102, a number of laser beam propagation paths 104, and a number of the laser irradiation devices 106. In FIG. 3, three laser oscillators 102, three laser beam propagation paths 104, and three laser irradiation devices 106 are shown, and the configurations of the three are the same.

For example, the laser oscillator 102 emits a laser beam with an output of 100 W or more. In addition, as described later, as the laser oscillator 102, an oscillator which emits a laser beam at a wavelength of higher than 7 μm is preferable. As the laser oscillator 102, for example, a $CO_2$ laser with a laser beam wavelength of 10.6 μm is used. Moreover, in this embodiment, the laser oscillator 102 emits a linearly polarized laser beam having a predetermined polarization direction. The reason that the linearly polarized laser beam is used will be described later. The laser oscillator 102 may be either a continuous wave laser or a pulsed laser.

A laser light having an electric field component (linearly polarized component) that oscillates only in one direction is ideal for the linearly polarized laser in the present invention. Strictly speaking, an electric field component that is perpendicular to the linearly polarized component (orthogonal component) exists very slightly. The ratio between the power of the linearly polarized component and the power of the orthogonal component is dependent on the performance of a polarizing beam splitter 124 described above and the performance of the laser oscillator 102. When it is assumed that the power of the linearly polarized component is given by PW1 and the power of the orthogonal component is given by PW2, and PW1/(PW1+PW2)) is defined as a degree of polarization, the linearly polarized light in the present invention has a degree of polarization of 0.9 or higher and lower than 1.0. That is, in a case where a linearly polarized laser having a degree of polarization of 0.9 or higher and lower than 1.0 (90% or higher and lower than 100%) was used, the results of Examples, which will be described later, were obtained. In addition, by splitting the linearly polarized light using an orthogonal prism or the like, the proportions of the linearly polarized components can be analyzed.

The laser irradiation device 106 allows the laser beam propagated from the laser oscillator 102 to the laser beam propagation path 104 to be focused on the grain-oriented electromagnetic steel sheet 10 such that the laser beam is scanned on the grain-oriented electromagnetic steel sheet 10 along a direction substantially perpendicular to the rolling direction. A width which is scanned with the laser beam by a single laser irradiation device 106 may be smaller than the sheet width of the grain-oriented electromagnetic steel sheet 10. However, as shown in FIG. 3, by arranging a number of laser irradiation devices 106 in the sheet width direction, the region of the overall sheet width of the grain-oriented electromagnetic steel sheet 10 can be scanned with the laser beam.

As shown in FIG. 4, the laser irradiation device 106 includes a λ/2 plate 125, a metallic mirror 126, a polygon mirror 128, and a parabolic mirror 130.

The λ/2 plate 125 is inserted to adjust the linear polarization direction by changing its rotational angle. In a case where the linear polarization direction on the steel sheet follows a predetermined direction, which will be described later, the λ/2 plate 125 may be omitted. As an element for changing the linear polarization direction, a Faraday rotator or the like may be used instead of the λ/2 plate 125.

In the above description, the laser beam emitted from the laser oscillator 102 is a linearly polarized light. However, the laser beam emitted from the laser oscillator 102 is not necessarily to be the linearly polarized light. In a case where the laser beam emitted from the laser oscillator 102 is unpolarized light, a polarizing beam splitter may be installed in front of the λ/2 plate 125 to convert the unpolarized light into linearly polarized light. When the polarizing beam splitter is arranged to rotate around the center axis of the laser beam, the linear polarization direction on the surface of the steel sheet can be adjusted to be a predetermined direction even when the λ/2 plate 125 is not installed. As described above, the linearly polarized laser beam can propagate to the metallic mirror 126. The reason that the laser beam is the linearly polarized light will be described later.

The metallic mirror 126 is a mirror that squeezes and adjusts the beam diameter of the incident laser beam in the sheet width direction (see FIG. 5) of the grain-oriented electromagnetic steel sheet 10. As the metallic mirror 126, for example, a cylindrical mirror or a parabolic mirror having a curvature in a uniaxial direction may be used. The laser beam reflected by the metallic mirror 126 is incident on the polygon mirror 128 that rotates at a predetermined rotational speed.

The polygon mirror 128 is a rotatable polyhedron and scans the laser beam on the grain-oriented electromagnetic steel sheet 10 along the sheet width direction thereof as the polygon mirror 128 rotates. While the laser beam is incident on one side of the polyhedron of the polygon mirror 128, a single line-shaped region on the grain-oriented electromagnetic steel sheet 10 along the sheet width direction is scanned with the laser beam as the side rotates such that a residual strain is generated to the line-shaped region. As the polygon mirror rotates, scanning of the laser beam is repeatedly performed, and the grain-oriented electromagnetic steel sheet 10 is simultaneously transported in the rolling direction. As a result, a region having a line-shaped residual strain is periodically formed on the grain-oriented electromagnetic steel sheet 10 in the rolling direction. The period of the line-shaped regions along the rolling direction is adjusted by the transportation speed of the grain-oriented electromagnetic steel sheet 10 and the rotational speed of the polygon mirror 128.

The parabolic mirror 130 is a mirror that squeezes and adjusts the beam diameter of the laser beam reflected by the polygon mirror 128 in the rolling direction. The laser beam reflected by the parabolic mirror 130 is focused on the surface of the grain-oriented electromagnetic steel sheet 10.

Figure 5:
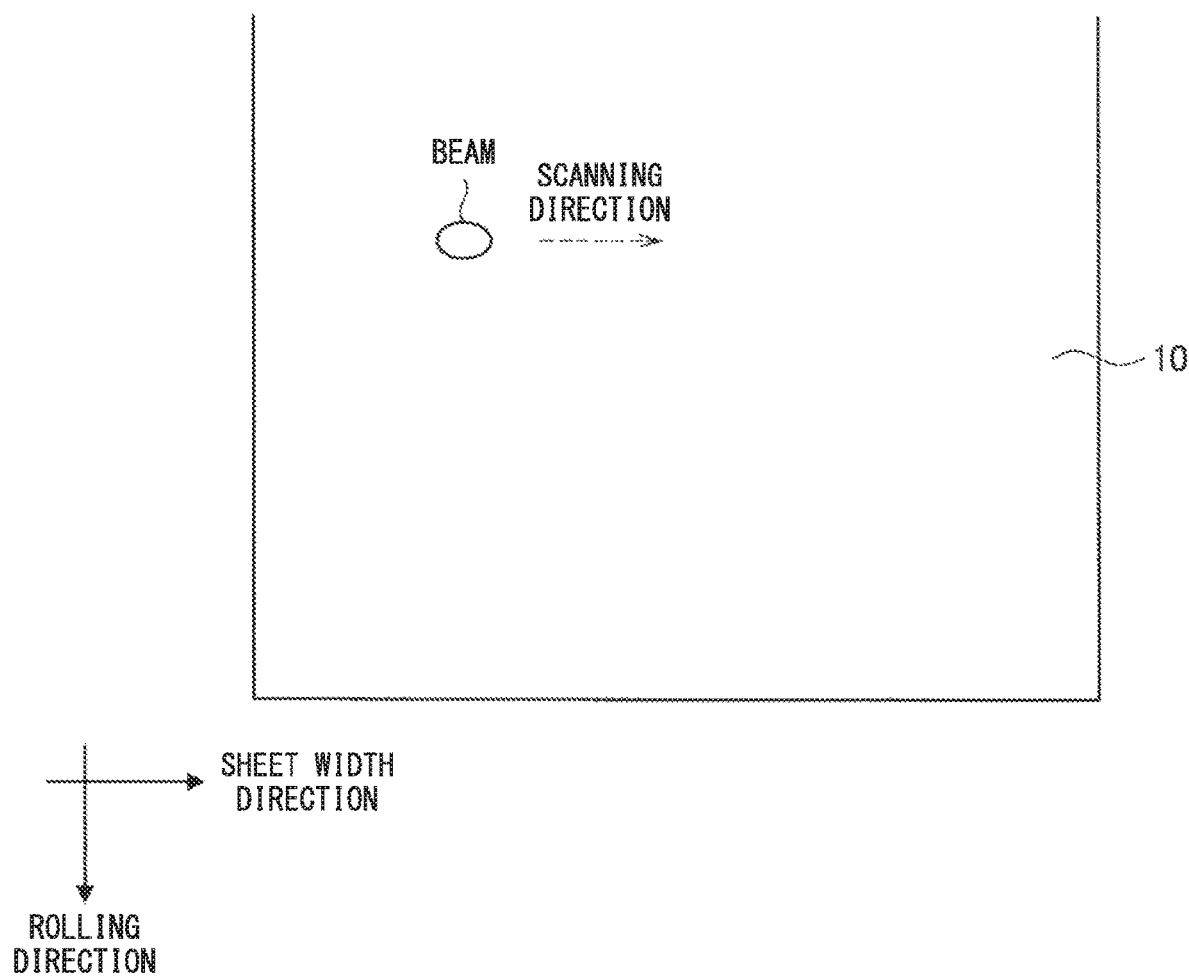
FIG. 5 is a view showing a shape of a laser beam focused on the grain-oriented electromagnetic steel sheet 10.

FIG. 5 is a view showing the shape of the laser beam focused on the grain-oriented electromagnetic steel sheet 10. In this embodiment, the shape of the focused laser beam is an ellipse as shown in FIG. 5. The major axis direction of the ellipse is parallel to the scanning direction of the laser beam, and the minor axis direction of the ellipse is perpendicular to the scanning direction. In other words, the minor axis direction of the ellipse is parallel to the rolling direction. By setting the shape of the focused laser beam to be the ellipse, the time for irradiating one point on the grain-oriented electromagnetic steel sheet 10 with the laser beam increases. As a result, the temperature of the grain-oriented electromagnetic steel sheet 10 can be increased toward a deep position of the inside thereof, which is effective in reducing core loss. Since the beam diameter in the sheet width direction is squeezed by the metallic mirror 126 and the beam diameter in the rolling direction is squeezed by the parabolic mirror 130, the shape of the focused laser beam becomes an ellipse. In addition, when the shape of the focused laser beam is the ellipse, the area of the focused laser beam increases compared to a case where the focused shape is a true circle, resulting in a reduction in power density. As a result, a temperature gradient along the thickness direction in the vicinity of the surface of the grain-oriented electromagnetic steel sheet 10 is prevented from becoming steep, which is effective in suppressing the generation of defects in the glass coating film 14.

In the above description, a case where the shape of the laser beam focused on the grain-oriented electromagnetic steel sheet 10 is an ellipse is exemplified, but the present invention is not limited thereto. For example, the shape of the focused laser beam may also be a true circle.

In this embodiment, it is preferable that the intensity distribution of the laser beam is set such that the beam diameter (a width including 86% of the integrated intensity) in the rolling direction becomes 200 μm or smaller. Accordingly, narrower circulating current magnetic domains are formed while further suppressing the expansion of thermal conduction in the rolling direction, thereby significantly reducing core loss. Furthermore, in order to reliably reduce core loss, it is more preferable that the beam diameter be set to 120 μm or smaller.

<Incident State of Laser Beam on Laser Scanning Width>

When the laser irradiation device 106 scans the surface of the grain-oriented electromagnetic steel sheet 10 with the laser beam over a predetermined laser scanning width, the states of the laser beam incident on the surface of the grain-oriented electromagnetic steel sheet 10 at the center portion and the end portion of the laser scanning width are different from each other.

Figure 6:
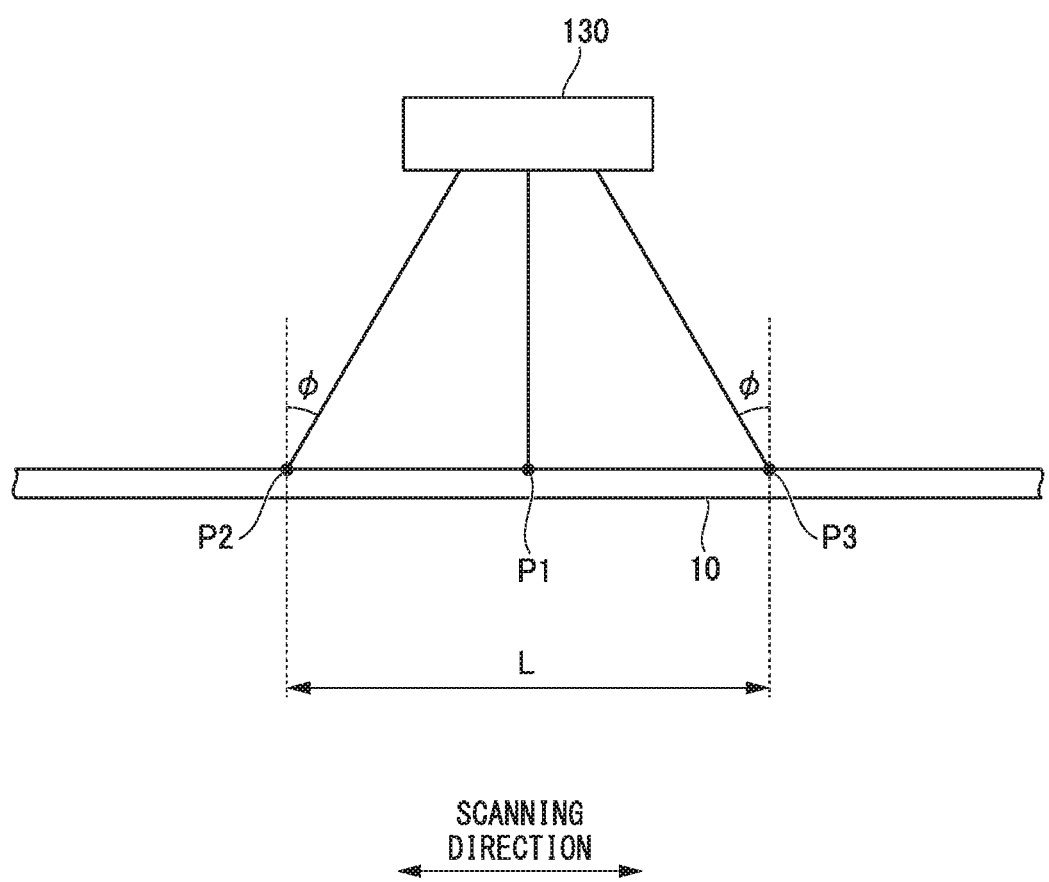
FIG. 6 is a schematic view showing states of the laser beam incident on the grain-oriented electromagnetic steel sheet 10.

FIG. 6 is a schematic view showing the state of the laser beam incident on the grain-oriented electromagnetic steel sheet 10. When the laser irradiation device 106 scans the laser beam over a predetermined laser scanning width L in the scanning direction, as shown in FIG. 6, the state of the laser beam incident on a center portion P1 of the laser scanning width L is different from the state of the laser beam incident on end portions P2 and P3 of the laser scanning width L. Specifically, the laser beam reflected by the parabolic mirror 130 of the laser irradiation device 106 is incident perpendicular to the surface (insulating coating film 16) of the grain-oriented electromagnetic steel sheet 10 at the center portion P1 of the laser scanning width L. On the other hand, the laser beam is obliquely incident on the surface of the grain-oriented electromagnetic steel sheet 10 (incident at an incident angle with respect to the direction normal to the surface) at both the end portions P2 and P3 of the laser scanning width L.

That is, in a case where the incident position of the laser beam is coincident with the center portion P1 of the laser scanning width L, the angle between the direction perpendicular to (direction normal to) the surface of the grain-oriented electromagnetic steel sheet 10 and the propagation direction of the laser beam (the incident angle φ of the laser beam) becomes 0°. On the other hand, as the incident position of the laser beam approaches the end portion P2 or P3 of the laser scanning width L, the incident angle φ of the laser beam increases.

Figure 7A:
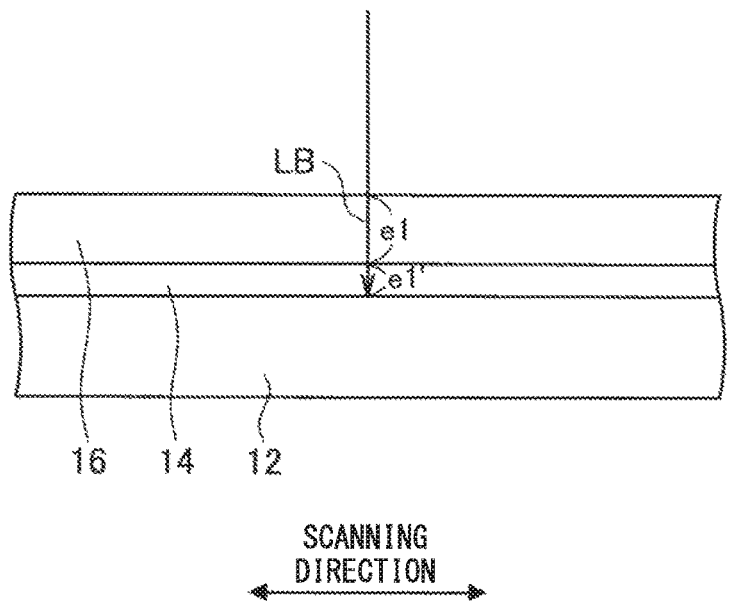
FIG. 7A shows a path length e1 in an insulating coating film 16 and a path length e1' in a glass coating film 14 of the laser beam incident on the insulating coating film 16 at a center portion P1 of a laser scanning width L.
Figure 7B:
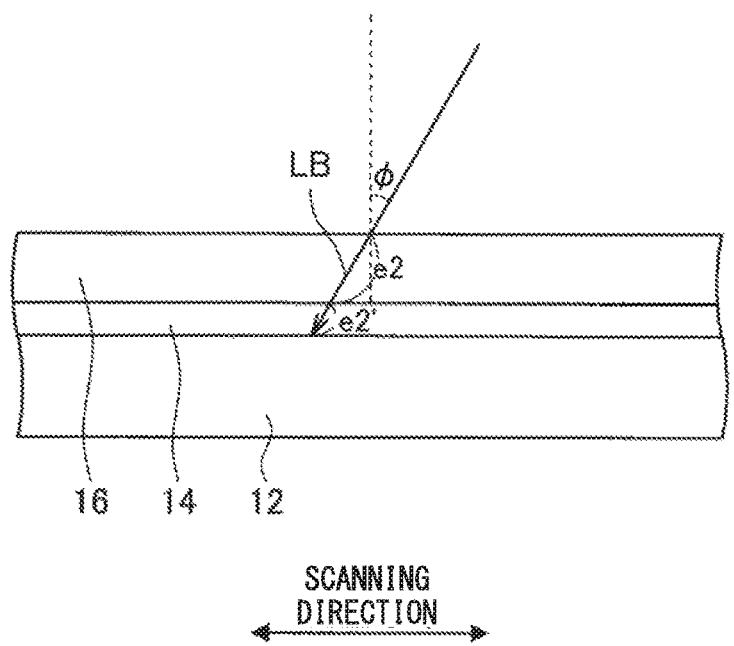
FIG. 7B shows a path length e2 in the insulating coating film 16 and a path length e2' in the glass coating film 14 of the laser beam incident on the insulating coating film 16 at an end portion P2 of the laser scanning width L.

FIGS. 7A and 7B are schematic views showing path lengths of the laser beam within the insulating coating film 16. FIG. 7A shows a path length e1 in the insulating coating film 16 and a path length e1' in the glass coating film 14 of the laser beam incident on the insulating coating film 16 at the center portion P1 of the laser scanning width L. FIG. 7B shows a path length e2 in the insulating coating film 16 and a path length e2' in the glass coating film 14 of the laser beam incident on the insulating coating film 16 at the end portion P2 of the laser scanning width L. The path lengths of the laser beam incident on the insulating coating film 16 at the end portion P3 of the laser scanning width L are the same as those in FIG. 7B.

The transmittance of the laser beam through the insulating coating film 16 and the glass coating film 14 is expressed by $\exp(-\alpha L)$ according to the Lambert-Beer law which is well known. Here, a is the absorption coefficient, and L is the path length. As the path length L increases, the transmittance decreases. That is, as the path length L increases, the power of the laser beam absorbed inside the glass coating film 16 and inside the glass coating film 14 increases. As is apparent from FIGS. 7A and 7B, since the path length e2 (e2') is greater than the path length e1 (e1'), the amount of the laser beam absorbed by the insulating coating film 16 (the glass coating film 14) at the end portion P2 (P3) of the laser scanning width L increases. As a result, a higher power is supplied to the grain-oriented electromagnetic steel sheet 10 at the end portion P2 (P3) of the laser scanning width L than at the center portion P1, the temperature excessively increases, and defects are easily generated in the insulating coating film 16 or the glass coating film 14.

Figure 8:
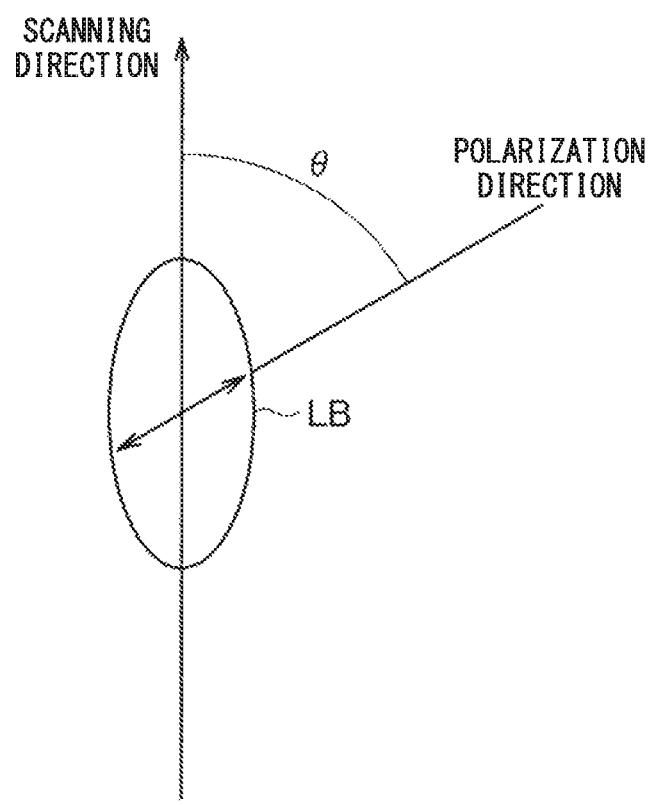
FIG. 8 is a schematic view showing the relationship between a linear polarization direction and a scanning direction of the laser beam.

In this embodiment, in order to solve the above-described problems, the laser beam focused on the surface (the insulating coating film 16) of the grain-oriented electromagnetic steel sheet 10 is set to be linearly polarized light, and as shown in FIG. 8, the angle $\theta$ between the linear polarization direction and the scanning direction of the laser beam is set to be higher than 45° and equal to or lower than 90°. FIG. 8 is a schematic view showing the relationship between the linear polarization direction and the scanning direction of the laser beam in a case where the incident angle of the laser beam is 0°. As far as the angle $\theta$ between the scanning direction of the laser beam and the linear polarization direction is higher than 45° and equal to or lower than 90°, the relationship between the linear polarization direction and the scanning direction of the laser beam may have a reflectional symmetry with respect to FIG. 8.

As in this embodiment, in a case where the angle $\theta$ is set to be higher than 450 and equal to or lower than 90°, as described later, the absorptance of the laser beam at the end portions P2 and P3 of the laser scanning width L can be decreased. Therefore, even when the path length of the laser beam at the end portions P2 and P3 of the laser scanning width L increases, an increase in the power absorbed by the insulating coating film 16 can be suppressed. As a result, the generation of defects in the glass coating film 14 at the end portions P2 and P3 of the laser scanning width L can be suppressed.

<Relationship Between Linearly Polarized Eight and Absorptance>

Here, the principle that the absorptance of the laser beam is decreased by the angle $\theta$ between the linear polarization direction and the scanning direction of the laser beam is described.

A portion of the laser beam incident on the grain-oriented electromagnetic steel sheet 10 is reflected by the insulating coating film 16, and the remainder is incident on the insulating coating film 16. A portion of the laser beam incident on the insulating coating film 16 is absorbed inside the insulating coating film 16 and the remainder reaches the upper surface of the glass coating film 14 such that a portion thereof is reflected and the remainder thereof is incident on the glass coating film 14. A portion of the laser beam incident on the glass coating film 14 is absorbed inside the glass coating film 14 and the remainder reaches the upper surface of the steel sheet body (hereinafter, also called base steel material) 12 such that a portion thereof is reflected and the remainder thereof is absorbed by the surface of the steel sheet body 12. In addition, the power of the laser beam transmitted to the grain-oriented electromagnetic steel sheet 10 is dependent on the absorptance of the laser beam absorbed by the insulating coating film 16 and the like as described above. When the absorptance of the laser beam at the insulating coating film 16 and the like is high, the power of the laser beam transmitted to the grain-oriented electromagnetic steel sheet 10 increases.

However, linearly polarized light generally includes P-polarized light (also called P waves) and S-polarized light (also called S waves). It is known that the absorptance of P-polarized light and the absorptance of S-polarized light are different from each other. Therefore, depending on the absorptances of the P-polarized light and the S-polarized light into the insulating coating film 16 and the like, the power of the laser beam transmitted to the grain-oriented electromagnetic steel sheet 10 varies.

Figure 9A:
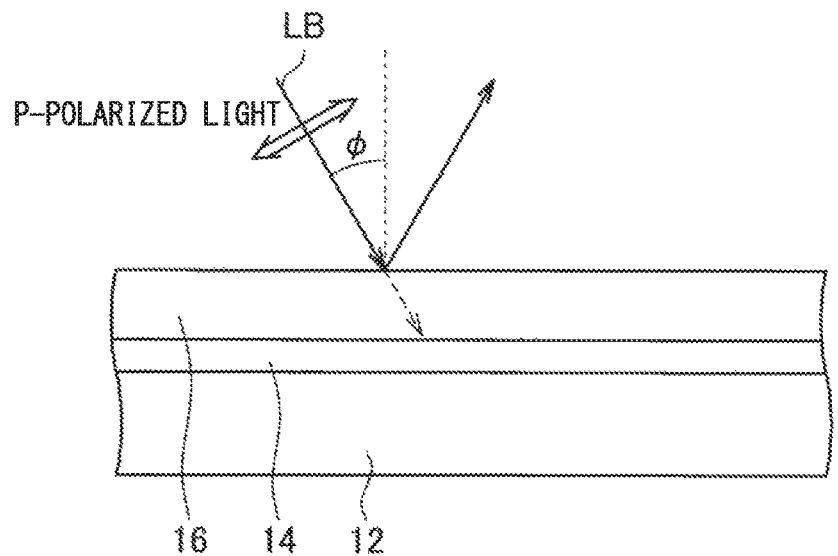
FIG. 9A is a view showing an electric field oscillation direction of P-polarized light in a case where linearly polarized light LB is incident on the surface of the grain-oriented electromagnetic steel sheet 10 at an incident angle $\phi$.
Figure 9B:
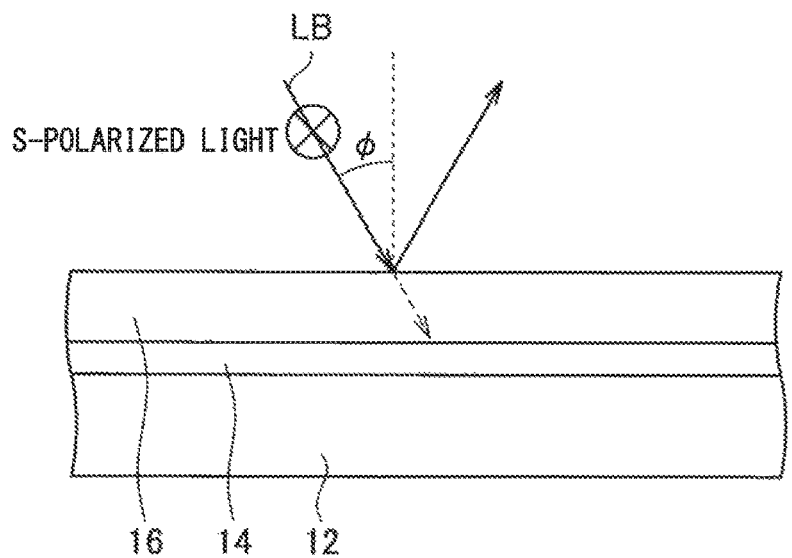
FIG. 9B is a view showing an electric field oscillation direction of S-polarized light in a case where the linearly polarized light LB is incident on the surface of the grain-oriented electromagnetic steel sheet 10 at the incident angle $\phi$.

FIG. 9A shows an electric field oscillation direction of P-polarized light in a case where linearly polarized light LB is incident on the surface of the grain-oriented electromagnetic steel sheet 10 at an incident angle $\phi$. FIG. 9B shows an electric field oscillation direction of S-polarized light in the case where the linearly polarized light LB is incident on the surface of the grain-oriented electromagnetic steel sheet 10 at the incident angle $\phi$. As shown in FIGS. 9A and 9B, in a case where the linearly polarized light LB is incident on the surface of the grain-oriented electromagnetic steel sheet 10 at the incident angle 4, the electric field oscillation direction of the P-polarized light and the electric field oscillation direction of the S-polarized light are different from each other. Specifically, during scanning the linearly polarized light, the electric field of the P-polarized light oscillates along the double arrow direction shown in FIG. 9A, and the electric field of the S-polarized light oscillates along the direction perpendicular to the figure as shown in FIG. 9B.

Figure 10:
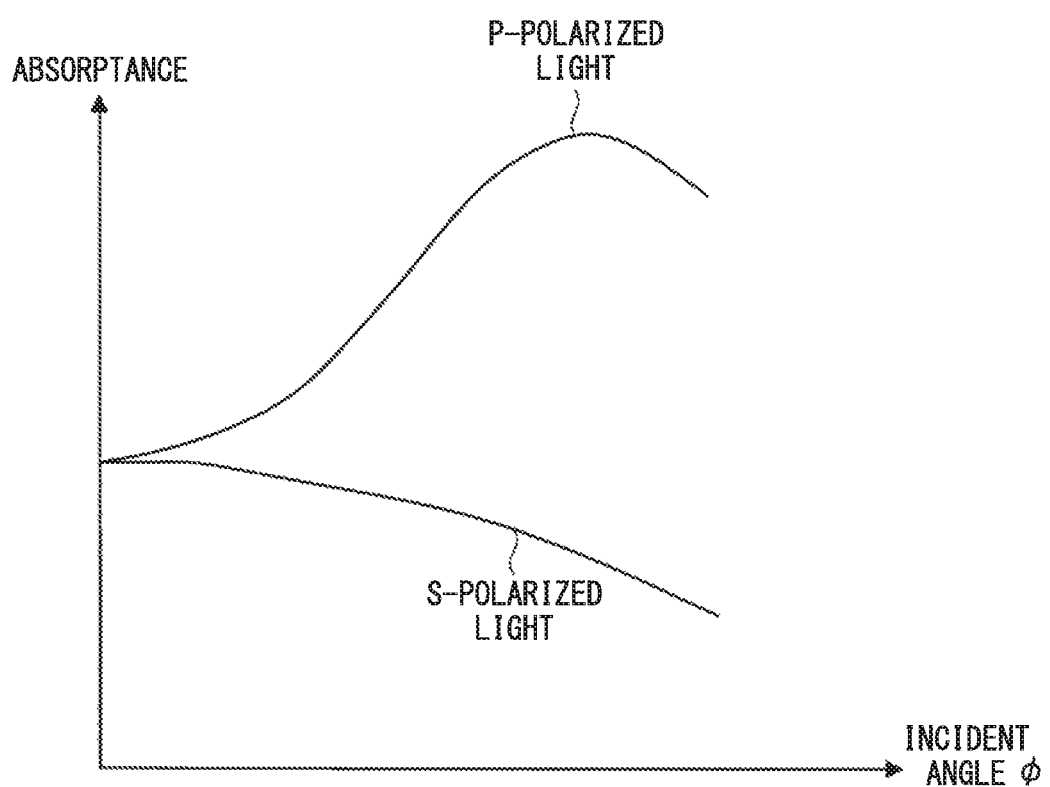
FIG. 10 is a graph showing the absorptances of P-polarized light and S-polarized light of a laser beam at the upper surface of a base steel material 12.

FIG. 10 is a graph showing the absorptances of the P-polarized light and the S-polarized light of the laser beam at the upper surface of the base steel material 12. As shown in FIG. 10, the absorptance of the P-polarized light is higher than the absorptance of the S-polarized light. In addition, as the incident angle $\phi$ of the laser beam (linearly polarized light) increases, the absorptance of the P-polarized light increases, and the absorptance of the S-polarized light decreases. FIG. 10 shows the absorptances at the upper surface of the base steel material 12, which remains after removal of the insulating coating film 16 and the glass coating film 14 from the grain-oriented electromagnetic steel sheet 10. However, the absorptance at the upper surface of the insulating coating film 16 and the absorptance at the upper surface of the glass coating film 14 have the same tendency as that of FIG. 10.

In a case where the angle $\theta$ between the linear polarization direction and the scanning direction of the laser beam is 0°, only the P-polarized light is incident on an incident surface (the surface of the grain-oriented electromagnetic steel sheet 10). In a case where the angle $\theta$ is 45°, the P-polarized light and the S-polarized light are incident on the incident surface one half for each. In a case where the angle $\theta$ is 90°, only the S-polarized light is incident on the incident surface. Therefore, in a case where the angle $\theta$ is equal to or higher than 0° and lower than 45°, the effect of the P-polarized light between the P-polarized light and the S-polarized light becomes dominant, and as the incident angle $\phi$ increases, the absorptance of the laser beam increases. On the other hand, in a case where angle $\theta$ is higher than 45° and equal to or lower than 90°, the effect of the S-polarized light becomes dominant, and as the incident angle $\phi$ increases, the absorptance of the laser beam decreases.

In this embodiment, for reducing the absorptance of the laser beam at the end portions P2 and P3 of the laser scanning width L of the laser irradiation device 106, the angle $\theta$ between the linear polarization direction and the scanning direction of the laser beam is set to be higher than 45° and equal to or lower than 90°. Accordingly, the effect of the S-polarized light out of the P-polarized light and the S-polarized light becomes dominant. Therefore, at the end portions P2 and P3 of the laser scanning width L, even when the path length of the laser beam in the insulating coating film 16 and the glass coating film 14 increases, the amount of the laser beam absorbed by the insulating coating film 16 and the glass coating film 14 can be reduced. As a result, an increase in the temperature of the insulating coating film 16 and the like can be suppressed, and thus the generation of defects of the glass coating film 14 at the end portions P2 and P3 of the laser scanning width L can be suppressed.

Particularly, in a case where the angle θ between the linear polarization direction and the scanning direction of the laser beam is set to 70° or higher and 90° or lower, the effect of the S-polarized light becomes more dominant, and the amount of the laser beam absorbed by the insulating coating film 16 and the glass coating film 14 further decreases, and thus the generation of defects in the glass coating film 14 at the end portions P2 and P3 of the laser scanning width L can be further suppressed.

In addition, in this embodiment, it is even more preferable that the wavelength of the laser beam for scanning is higher than 7 μm. In a case where the wavelength of the laser beam is higher than 7 μm, the insulating coating film 16 is opaque to the laser beam, and the laser beam is easily absorbed by the insulating coating film 16 and the glass coating film 14. Therefore, in a case where a laser beam at a wavelength in the above-described range is focused on and scanned on the grain-oriented electromagnetic steel sheet 10, a higher power is likely to be absorbed by the insulating coating film 16 and the glass coating film 14 at the end portions P2 and P3 of the laser scanning width L when the laser beam is obliquely incident. Under this situation, as described above, by setting the angle θ to be higher than 45° and equal to or lower than 90°, the amount of the laser beam reflected by the upper surface of each of the insulating coating film 16 and the glass coating film 14 at the end portions P2 and P3 of the laser scanning width L increases, and the amount of the laser beam absorbed decreases. Therefore, the power of the laser beam incident into the inside of each of the insulating coating film 16 and the glass coating film 14 decreases. As a result, the power of the laser beam absorbed inside each of the insulating coating film 16 and the glass coating film 14 can be reduced, and thus the effectiveness of this embodiment can be further reliably exhibited.

In addition, the inventors discovered that when the magnification of a path length with respect to a path length (e1+e1' of FIG. 7A, hereinafter, called reference path length) in a case where the incident angle 4 of the laser beam is 0° is higher than 19%, as described above, even when the angle θ between the linear polarization direction and the scanning direction is set to be higher than 45° and equal to or lower than 90°, the absorptance of the laser beam at the end portions P2 and P3 of the laser scanning width L cannot be sufficiently reduced (in other words, defects are likely to be generated in the glass coating film 14 at the end portions P2 and P3 of the laser scanning width L).

It is thought that this is because when the magnification of the path length with respect to the reference path length is higher than 19%, an increase in the amount of the absorbed power due to an increase in the path length cannot be compensated by a reduction of the absorptance of the laser beam (linearly polarized light).

Therefore, in order to reliably prevent the generation of defects in the glass coating film 14 over the entire laser scanning width L, it is preferable that the maximum incident angle $\phi_{MAX}$ of the laser beam is set on the basis of the following conditional expression (1).

$$1/\cos \phi_{MAX} \leq 1.19 \tag{1}$$

In the conditional expression (1), the left side represents the magnification of the path length (the path length at the maximum incident angle $\phi_{MAX}$) with respect to the reference path length. Therefore, using the conditional expression (1), the maximum incident angle $\phi_{MAX}$ at which the magnification with respect to the reference path length is not higher than 19% can be obtained. According to the conditional expression (1), it can be seen that it is preferable that the maximum incident angle $\phi_{MAX}$ is 33° or lower. For example, in the laser irradiation device 106 which uses the polygon mirror 128 shown in FIG. 4, when the number of sides of the polygon mirror 128 is given by N, the maximum incident angle $\phi_{MAX}$ of the laser beam can be expressed by 360°/N. Therefore, it is preferable that in the laser irradiation device 106 shown in FIG. 4, N be 11 or higher.

Figure 11:
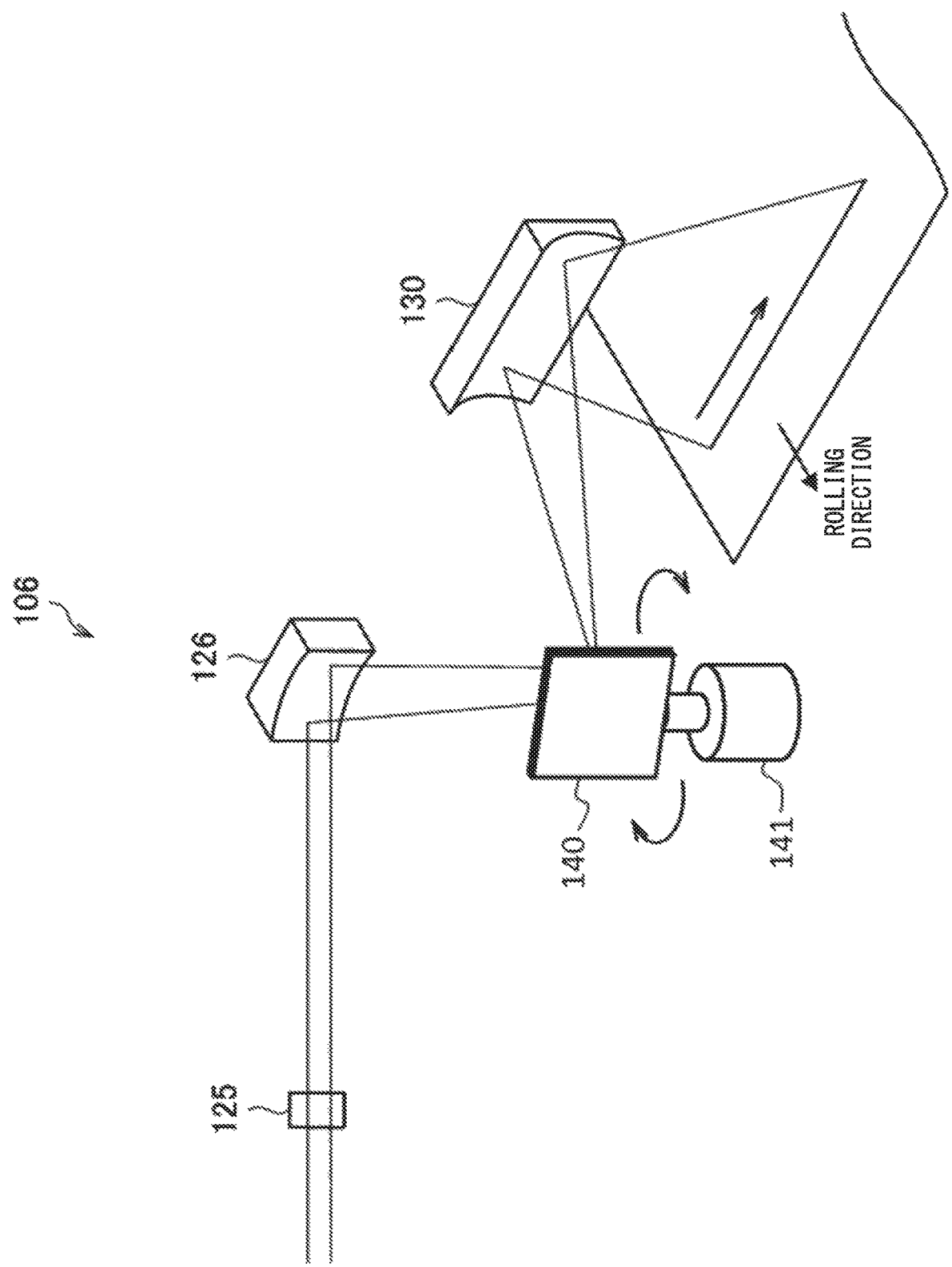
FIG. 11 is a view showing a modification example of the laser irradiation device 106.

As shown in FIG. 11, a galvano mirror 140 may be used instead of the polygon mirror 128. The galvano mirror 140 is driven by a driving motor 141 to rotate in arrow directions in the figure. As the galvano mirror 140 rotates, the grain-oriented electromagnetic steel sheet 10 is scanned with the laser beam along the sheet width direction thereof (scanning direction). In this configuration, it is possible to control the incident angle φ of the laser beam by controlling the rotational angle of the galvano mirror 140. Therefore, it is easy to set the maximum incident angle $\phi_{MAX}$ of the laser beam to an appropriate value by using the galvano mirror 140.

In addition, in the above-described embodiment, the laser oscillator 102 emits the linearly polarized laser beam, but the present invention is not limited thereto. For example, the laser oscillator 102 may emit an unpolarized laser beam, and a polarizer such as a polarizing beam splitter which converts the unpolarized laser beam into linearly polarized light having a predetermined polarization direction may be provided in front of the metallic mirror 126. Furthermore, the magnitude of the angle θ described above may be adjusted by adjusting the rotational angle of the polarizing beam splitter abound the center axis of the laser beam.

<Refinement of Magnetic Domains and Defects in Glass Coating Film>

As described above, the grain-oriented electromagnetic steel sheet 10 in which a magnetic field is applied in the rolling direction has a structure in which a number of magnetic domains having a magnetization direction that substantially aligns with the rolling direction are structured. Here, in order to achieve a further reduction in the core loss of the grain-oriented electromagnetic steel sheet 10, it is effective to refine the magnetic domains (reduce the magnetic domains in width) through laser beam irradiation. Particularly, it is effective to obtain circulating current magnetic domains which are narrow and have sufficient strength by generating a significant temperature gradient along the thickness direction in a very narrow region that is present in the vicinity of the uppermost layer of the grain-oriented electromagnetic steel sheet 10 in the rolling direction.

On the other hand, when the temperature gradient along the thickness direction is increased, the temperature of the surface of the grain-oriented electromagnetic steel sheet 10 increases. Due to the temperature increase, there may be cases where defects such as defective peeling are generated in the insulating coating film 16 or the glass coating film 14.

Particularly in a case where defects are generated in the glass coating film 14, the steel sheet body 12 is exposed to the outside and there is concern that rust may be generated. Therefore, there is a need to prevent the generation of defects in the glass coating film 14 while reducing the core loss of the grain-oriented electromagnetic steel sheet 10.

According to this embodiment, not only the generation of defects can be suppressed over the entire laser scanning width L, but also an effect of reducing core loss can be obtained. That is, in a laser magnetic domain control method in which an unpolarized laser beam is used in the related art, as described above, the power of the laser beam absorbed at the end portions P2 and P3 of the laser scanning width L increases due to an increase in the path length, and thus defects are likely to be generated in the insulating coating film 16 or the glass coating film 14. In order to compensate for this, the power of the laser beam may be reduced. In this case, while the generation of defects at the end portions P2 and P3 can be suppressed, the power of the laser beam at the center portion P2 of the laser scanning width L also decreases, which causes a problem of a reduction in the core loss reducing effect. On the other hand, in this embodiment, as described above, in order to decrease the absorption of the laser beam at the end portions P2 and P3 of the laser scanning width L, the grain-oriented electromagnetic steel sheet 10 is scanned with the linearly polarized light including the S-polarized light of which the absorptance decreases as the incident angle $\phi$ increases. Here, at the center portion P1 of the laser scanning width L, since the linearly polarized light is incident perpendicular to the surface of the grain-oriented electromagnetic steel sheet 10 (the incident angle $\phi$ shown in FIGS. 6 and 9 is small), the absorptances of the P-polarized light and the S-polarized light at the center portion P1 are substantially the same (see FIG. 10). The fact that there is no difference in absorptance between the P-polarized light and the S-polarized light which constitute an unpolarized state means that employment of the S-polarized light hardly reduces the absorptance. Therefore, in the laser processing apparatus 100 of this embodiment, without a reduction of the power of the laser beam transmitted to the grain-oriented electromagnetic steel sheet 10 at the center portion P1 of the laser scanning width L, only the power of the laser beam absorbed at the end portions P2 and P3 can be reduced. Accordingly, a reduction in core loss and the suppression of the generation of defects can be realized over the entire laser scanning width L.

In the above-described embodiment, as the laser oscillator 102 which emits a laser beam at a wavelength of higher than 7 μm, the $CO_2$ laser is used as an example, but the present invention is not limited thereto. For example, as the laser oscillator which emits a laser beam at a wavelength of higher than 7 μm, a fiber laser. Raman fiber lasers, a quantum cascade laser, or the like may be used.

In the above-described embodiment, as shown in FIG. 1, an example in which the grain-oriented electromagnetic steel sheet 10 constituted by a three-layer structure including the base steel material 12, the glass coating film 14, and the insulating coating film 16 irradiated with the laser beam has been described. However, even for a steel sheet having two layers including the base steel material 12 and the insulating coating film 16 as the basic structure without the glass coating film 14, the laser processing apparatus 100 of this embodiment exhibits an effect of suppressing the generation of defects in the insulating coating film 16 at the end portions P2 and P3 of the laser scanning width L. This is because even when the glass coating film 14 is absent, by employing the linearly polarized light as the laser beam and setting the angle θ to be in the above-described range, the amount of the laser beam absorbed by the insulating coating film 16 at the end portions P2 and P3 of the laser scanning width L can be reduced. As a grain-oriented electromagnetic steel sheet without the glass coating film 14, a grain-oriented electromagnetic steel sheet in which the surface of a base steel material has small roughness and is close to a mirror surface and thus exhibits ultra-low core loss characteristics is known. In the grain-oriented electromagnetic steel sheet having such ultra-low core loss characteristics, in order to prevent the generation of rust caused by the exposure of the base steel material 12, it is important that defects are not generated in the insulating coating film 16 during laser beam irradiation. As described above, the laser processing apparatus 100 of this embodiment is effective in suppressing the generation of defects.

EXAMPLE

In order to confirm the effectiveness of Examples according to the embodiment described above, a confirmation test example according to Examples and Comparative Examples will be described.

First, a slab having a composition including Si: 3.0 mass %, C: 0.05 mass %, Mn: 0.1 mass %, acid-soluble Al: 0.02 mass %, N: 0.01 mass %, S: 0.01 mass %, P: 0.02 mass %, and Fe and unavoidable impurities as the remainder was prepared. Hot rolling was performed on the slab at 1280° C., thereby producing a hot rolled material having a thickness of 2.3 mm. Next, a heat treatment was performed on the hot rolled material under the condition of 1000° C.×1 minute. A pickling treatment was performed on the resultant after the heat treatment, and cold rolling was performed on the resultant, thereby producing a cold rolled material having a thickness of 0.23 mm. Decarburization annealing was performed on the cold rolled material under the condition of 800° C.×2 minutes. Next, an annealing separating agent primarily containing magnesia was applied to both surfaces of the cold rolled material after the decarburization annealing. In addition, the cold rolled material to which the annealing separating agent was applied was put in a batch type furnace in a state of being wound in a coil shape, and finishing annealing was performed thereon under the condition of 1200° C.×20 hours. Accordingly, a steel sheet base steel material (steel sheet body) having glass coating films formed on the surfaces was produced. Next, an insulating material formed of aluminum phosphate was applied onto the glass coating films and was baked (850° C.×1 minute), thereby forming insulating coating films.

The steel sheet base steel material having the insulating coating films and the glass coating films formed thereon was irradiated with a laser beam such that strain was given to the surface of the steel sheet base steel material.

As a laser irradiation device, the laser irradiation device 106 shown in FIG. 4 was used, and as the laser oscillator 102, a $CO_2$ laser was used. In Examples 1 to 4 and Comparative Example 1, regarding the linearly polarized laser beam emitted from the laser oscillator 102, the laser beam was focused on and scanned on the grain-oriented electromagnetic steel sheet 10 by rotating the λ/2 plate 125 provided between the laser oscillator 102 and the metallic mirror 126 in an optical path, while changing the angle θ between the linear polarization direction and the scanning direction. In Comparative Example 2, a λ/4 plate was provided instead of the λ/2 plate 125, and under the condition that circularly polarized light was used as the laser beam, the laser beam was focused on and scanned on the grain-oriented electromagnetic steel sheet 10. The circularly polarized light includes 50% P-polarized light and 50% S-polarized light. In addition, in both Examples and Comparative Examples, as the irradiation conditions of the laser beam reaching the grain-oriented electromagnetic steel sheet 10, the power of the laser beam was set to 2 kW, the beam diameter thereof in the scanning direction was set to 4 mm, the beam diameter thereof in the rolling direction was set to 0.15 mm, and the laser scanning width of the laser beam was set to 500 mm. The maximum incident angle $\phi_{MAX}$ was 24°.

In addition, the generation of rust caused by the generation of defects in the glass coating film 14 was determined by a humidity test. The humidity test was conducted according to JIS K 2246-5.34, and test conditions included a temperature of 50° C., a humidity of 98%, and a test time of 72 hours. Thereafter, whether or not rust was generated in the laser irradiated portion was visually checked. Regarding each of the conditions, 10 rectangular pieces having a size of 100 mm in length along the width direction of the steel sheet and 500 mm in length along the rolling direction of the steel sheet were cut, and the number of pieces where rust was generated was counted and evaluated.

The test results are shown in the following Table 1. In Comparative Example 1 (θ=45° with linearly polarized light) in which 50% P-polarized light and 50% S-polarized light were included and in Comparative Example 2 in which a circularly polarized laser beam was used, the generation of rust at the end portion of the laser scanning width was significant. On the other hand, in Examples 1 to 4, since the linearly polarized laser beam was used and the angle θ between the linear polarization direction and the scanning direction was set to be higher than 45° and equal to or lower than 90°, the generation of rust at the end portion of the laser scanning width can be significantly suppressed. Particularly, by setting the angle θ to 70° or higher and 90° or lower, the generation of rust can be completely prevented. When the angle θ was 60°, although the generation of rust at the end portion of the laser scanning width could not be confirmed, partial damage to the glass coating film 14 was confirmed. The damaged portion was observed with an optical microscope, and damage to the glass coating film 14 was present while the base steel material portion was not exposed to the outside. This is considered to be the reason why rust was not generated. When sections were observed with the microscope, in a case where the angle θ was 70° or higher, the glass coating film 14 was sound at the end portion of the laser scanning width.

TABLE 1

| | Type of polarisation | Angle θ (°) | Number of pieces where rust is generated at center portion | Number of pieces where rust is generated at end portion |
|---|---|---|---|---|
| Example 1 | Linearly polarized light | 90 | 0 | 0 |
| Example 2 | Linearly polarized light | 80 | 0 | 0 |
| Example 3 | Linearly polarized light | 70 | 0 | 0 |
| Example 4 | Linearly polarized light | 60 | 0 | 0 |
| Comparative Example 1 | Linearly polarized light | 45 | 0 | 3 |
| Comparative Example 2 | Circularly polarized light | — | 0 | 4 |

From the above-described test results, it can be seen that by setting the angle θ in a range where the effect of the S-polarized light between the P-polarized light and S-polarized light becomes dominant, that is, by setting the angle θ to be higher than 45° and equal to or lower than 90°, the absorptance of the laser beam at the end portion of the laser scanning width can be reduced compared to a case of unpolarized light, and as a result, the effect of suppressing the generation of rust at the end portion of the laser scanning width can be obtained.

In addition, in a case where the maximum incident angle $\phi_{MAX}$ of the laser beam was changed in a range of 24° to 40° while the angle θ between the linear polarization direction and the scanning direction was fixed to 90°, a change in the number of pieces where rust was generated at the end portion of the laser scanning width L was checked. The results are shown in Table 2.

TABLE 2

| Maximum incident angle $\phi_{MAX}$ (°) | $1/\cos\phi_{MAX}$ | Number of pieces where rust is generated at end portion |
|---|---|---|
| 24 | 1.09 | 0 |
| 30 | 1.15 | 0 |
| 33 | 1.19 | 0 |
| 36 | 1.24 | 2 |
| 40 | 1.31 | 4 |

The results are shown in Table 2. When the maximum incident angle $\phi_{MAX}$ was 33°, although the generation of rust at the end portion of the laser scanning width was not confirmed, partial damage to the glass coating film 14 was confirmed. The damaged portion was observed with an optical microscope, and damage to the glass coating film 14 was present while the base steel material portion was not exposed to the outside. This is considered to be the reason why rust was not generated. On the other hand, it could be seen that when the maximum incident angle $\phi_{MAX}$ of the laser beam was higher than 33°, the number of pieces where rust was generated at the end portion of the laser scanning width L was rapidly increased. It is thought that this is because when the maximum incident angle $\phi_{MAX}$ of the laser beam was higher than 33°, the magnification of a path length with respect to the reference path length becomes higher than 19%. That is, it was confirmed by the experiment that in order to reliably prevent the generation of rust over the entire laser scanning width L, it is preferable that the maximum incident angle $\phi_{MAX}$ of the laser beam is set on the basis of the above-described conditional expression (1).

CONCLUSION

As descried above, in the laser processing apparatus 100 according to this embodiment, the angle θ between the linear polarization direction of the light scanned on the grain-oriented electromagnetic steel sheet 10 and the scanning direction of the laser beam is set to be higher than 45° and equal to or lower than 90°.

Accordingly, the absorptance of the laser beam at the end portions P2 and P3 of the laser scanning width L of the glass coating film 14 can be reduced. Therefore, even though the path length of the laser beam at the end portions P2 and P3 increases due to oblique incidence, an increase in the power absorbed by the insulating coating film 16 and the glass coating film 14 at the end portions P2 and P3 can be suppressed. As a result, the generation of defects in the glass coating film 14 at the end portions P2 and P3 of the laser scanning width L can be suppressed. Furthermore, as described above, since the power of the laser beam absorbed at the center portion P1 of the laser scanning width L is not reduced, the effect of reducing core loss at the center portion P1 is not deteriorated. That is, reducing core loss and preventing the generation of defects in the glass coating film 14 can be simultaneously realized over the entire laser scanning width L.

In the laser processing apparatus 100 according to this embodiment, since a reduction in core loss and the suppression of defects in the glass coating film 14 described above can be achieved, the grain-oriented electromagnetic steel sheet 10 with low core loss can be produced while suppressing the generation of defects in the glass coating film 14. Therefore, a cause of an increase in cost due to re-application of the insulating coating film 16 caused by the generation of defects in the glass coating film 14 can be excluded. As a result, the grain-oriented electromagnetic steel sheet 10 with ultra-low core loss can be supplied at a lower cost. Furthermore, from the viewpoint of realizing a reduction in energy consumption through the distribution of the grain-oriented electromagnetic steel sheet 10 with ultra-low core loss worldwide, a great economic effect is exhibited.

While the preferred embodiment of the present invention has been described in detail with reference to the accompanying drawings, the present invention is not limited to the examples. It should be noted by those skilled in the technical field to which the present invention belongs that various changes and modifications can be made without departing from the technical spirit described in the claims, and it should be understood that these changes and modifications naturally belong to the technical scope of the present invention.

BRIEF DESCRIPTION OF THE REFERENCE SYMBOLS

10: GRAIN-ORIENTED ELECTROMAGNETIC STEEL SHEET
12: STEEL SHEET BODY
14: GLASS COATING FILM
16: INSULATING COATING FILM
100: LASER PROCESSING APPARATUS
102: LASER OSCILLATOR
104: LASER BEAM PROPAGATION PATH
106: LASER IRRADIATION DEVICE
125: λ/2 PLATE
126: METALLIC MIRROR
128: POLYGON MIRROR
130: PARABOLIC MIRROR

The invention claimed is:

1. A laser processing apparatus for refining magnetic domains of a grain-oriented electromagnetic steel sheet by setting a linearly polarized laser beam to be focused on the grain-oriented electromagnetic steel sheet and scanned in a scanning direction, the laser processing apparatus comprising:
a first linearly polarized laser oscillator configured to emit the linearly polarized laser beam, or a second laser oscillator configured to emit a laser beam and a polarizing beam splitter configured to convert the laser beam into the linearly polarized laser beam,
wherein, the linearly polarized laser beam emitted from the first linearly polarized laser oscillator or the second linearly polarized laser oscillator with the polarizing beam splitter is configured to be focused on the grain-oriented electromagnetic steel sheet in a linearly polarized state where an angle between a linear polarization direction of the linearly polarized laser beam focused on the grain oriented electromagnetic steel sheet and the scanning direction is higher than 45° and equal to or lower than 90° on a surface of the grain-oriented electromagnetic steel sheet, the linear polarization direction being a direction to which the linearly polarized laser beam is polarized,
wherein the linearly polarized laser beam has a degree of polarization,
wherein the degree of polarization=PW1/(PW1+PW2), and
wherein the degree of polarization >=0.9 and the degree of polarization <1.0,
where PW1 represents a power of linearly polarized component and PW2 represents a power of an orthogonal component.

2. The laser processing apparatus according to claim 1, wherein a maximum incident angle $\phi_{MAX}$ of the laser beam incident on the grain-oriented electromagnetic steel sheet satisfies the following conditional expression (1), $$1/\cos \phi_{MAX} \leq 1.19 \tag{1}$$

3. The laser processing apparatus according to claim 2, wherein a wavelength of the laser beam focused on the grain-oriented electromagnetic steel sheet is higher than 7 μm.

4. The laser processing apparatus according to claim 3, wherein the first laser oscillator or the second laser oscillator is a $CO_2$ laser.

5. The laser processing apparatus according to claim 4, wherein a shape of the laser beam focused on the grain-oriented electromagnetic steel sheet is an ellipse, and a minor axis direction of the ellipse is perpendicular to the scanning direction.

6. The laser processing apparatus according to claim 3, wherein a shape of the laser beam focused on the grain-oriented electromagnetic steel sheet is an ellipse, and a minor axis direction of the ellipse is perpendicular to the scanning direction.

7. The laser processing apparatus according to claim 2, wherein the first laser oscillator or the second laser oscillator is a $CO_2$ laser.

8. The laser processing apparatus according to claim 7, wherein a shape of the laser beam focused on the grain-oriented electromagnetic steel sheet is an ellipse, and a minor axis direction of the ellipse is perpendicular to the scanning direction.

9. The laser processing apparatus according to claim 2, wherein a shape of the laser beam focused on the grain-oriented electromagnetic steel sheet is an ellipse, and a minor axis direction of the ellipse is perpendicular to the scanning direction.

10. The laser processing apparatus according to claim 1, wherein a wavelength of the laser beam focused on the grain-oriented electromagnetic steel sheet is higher than 7 μm.

11. The laser processing apparatus according to claim 10, wherein the first laser oscillator or the second laser oscillator is a $CO_2$ laser.

12. The laser processing apparatus according to claim 11, wherein a shape of the laser beam focused on the grain-oriented electromagnetic steel sheet is an ellipse, and a minor axis direction of the ellipse is perpendicular to the scanning direction.

13. The laser processing apparatus according to claim 10, wherein a shape of the laser beam focused on the grain-oriented electromagnetic steel sheet is an ellipse, and a minor axis direction of the ellipse is perpendicular to the scanning direction.

14. The laser processing apparatus according to claim 1, wherein the first laser oscillator or the second laser oscillator is a $CO_2$ laser.

15. The laser processing apparatus according to claim 14, wherein a shape of the laser beam focused on the grain-oriented electromagnetic steel sheet is an ellipse, and a minor axis direction of the ellipse is perpendicular to the scanning direction.

16. The laser processing apparatus according to claim 1, wherein a shape of the laser beam focused on the grain-oriented electromagnetic steel sheet is an ellipse, and a minor axis direction of the ellipse is perpendicular to the scanning direction.

17. The laser processing apparatus according to claim 1, wherein one or more of laser irradiation devices comprises:

a $\lambda/2$ plate configured to adjust a linear polarization direction of the linearly polarized laser beam by changing its rotational angle;

a metallic mirror configured to squeeze and adjust a beam diameter of the linearly polarized laser beam adjusted by the $\lambda/2$ plate in a sheet width direction of the grain-oriented electromagnetic steel sheet;

a polygon mirror or a galvano mirror configured to scan the linearly polarized laser beam which is squeezed and adjusted by the metallic mirror on the grain-oriented electromagnetic steel sheet along the sheet width direction thereof; and a parabolic mirror configured to squeeze and adjust the beam diameter of the linearly polarized laser beam reflected by the polygon mirror or the galvano mirror in a rolling direction of the grain-oriented electromagnetic steel sheet.

* * * * *